(12) United States Patent
Pang et al.

(10) Patent No.: US 12,060,473 B2
(45) Date of Patent: Aug. 13, 2024

(54) POLYMER/EXFOLIATED NANO-COMPOSITE FILMS WITH SUPERIOR MECHANICAL PROPERTIES

(71) Applicant: UNIVERSITY OF NOTRE DAME DU LAC, South Bend, IN (US)

(72) Inventors: Yunsong Pang, South Bend, IN (US); Tengfei Luo, South Bend, IN (US)

(73) Assignee: University of Notre Dame Du Lac, South Bend, IN (US)

( * ) Notice: Subject to any disclaimer, the term of this patent is extended or adjusted under 35 U.S.C. 154(b) by 786 days.

(21) Appl. No.: 17/255,925

(22) PCT Filed: Jul. 2, 2019

(86) PCT No.: PCT/IB2019/055652
§ 371 (c)(1),
(2) Date: Dec. 23, 2020

(87) PCT Pub. No.: WO2020/008372
PCT Pub. Date: Jan. 9, 2020

(65) Prior Publication Data
US 2021/0122900 A1 Apr. 29, 2021

Related U.S. Application Data

(60) Provisional application No. 62/693,656, filed on Jul. 3, 2018, provisional application No. 62/776,813, filed on Dec. 7, 2018.

(51) Int. Cl.
| | |
|---|---|
| B29C 48/08 | (2019.01) |
| B29C 48/00 | (2019.01) |
| B29C 48/88 | (2019.01) |
| C08J 5/00 | (2006.01) |
| C08J 5/18 | (2006.01) |
| C08K 3/04 | (2006.01) |
| C08K 3/38 | (2006.01) |
| B29K 23/00 | (2006.01) |
| B29K 105/16 | (2006.01) |
| B29K 507/04 | (2006.01) |
| B29K 509/04 | (2006.01) |

(52) U.S. Cl.
CPC ............ *C08K 3/38* (2013.01); *B29C 48/0018* (2019.02); *B29C 48/022* (2019.02); *B29C 48/08* (2019.02); *B29C 48/9135* (2019.02); *C08J 5/005* (2013.01); *C08J 5/18* (2013.01); *C08K 3/042* (2017.05); *B29K 2023/0683* (2013.01); *B29K 2105/162* (2013.01); *B29K 2507/04* (2013.01); *B29K 2509/04* (2013.01); *B29K 2995/004* (2013.01); *C08J 2323/06* (2013.01); *C08K 2003/385* (2013.01); *C08K 2201/011* (2013.01)

(58) Field of Classification Search
CPC .... C08K 3/042; C08K 2201/011; C08K 3/38; C08J 5/18; B29K 2105/162; B29K 2507/04; B29K 2509/04; B29K 2995/0077; C08L 23/04; B29D 7/01; B82Y 30/00
See application file for complete search history.

(56) References Cited

U.S. PATENT DOCUMENTS

| | | | |
|---|---|---|---|
| 3,184,525 A | 5/1965 | Brandt | |
| 3,698,731 A | 10/1972 | Jost et al. | |
| 5,272,199 A | 12/1993 | Geissbuhler | |
| 5,468,429 A | 11/1995 | Li et al. | |
| 5,547,594 A | 8/1996 | Karydas | |
| 6,333,376 B1 | 12/2001 | Geissbuhler | |
| 6,513,753 B1 | 2/2003 | Toni et al. | |
| 6,676,077 B1 | 1/2004 | DiChiara, Jr. et al. | |
| 6,737,158 B1 | 5/2004 | Thompson | |
| 6,772,448 B1 | 8/2004 | Hockaday et al. | |
| 6,994,433 B2 | 2/2006 | Hockaday et al. | |

(Continued)

FOREIGN PATENT DOCUMENTS

| | | |
|---|---|---|
| CN | 107601468 A | 1/2018 |
| WO | 2008112349 A2 | 9/2008 |

(Continued)

OTHER PUBLICATIONS

Machine translation into English of WO-2016138572-A1; Caballero et al (Year: 2016).*

(Continued)

*Primary Examiner* — Karuna P Reddy
(74) *Attorney, Agent, or Firm* — Workman Nydegger

(57) ABSTRACT

Nano-composite films and methods for their fabrication. The nano-composite films include a polymer matrix (e.g., polyethylene, polypropylene, or the like) and a filler capable of exfoliation such as graphene or hexagonal boron nitride (e.g., TrGO). The filler provides reinforcement, increasing tensile strength, Young's modulus, or both for the resulting nano-composite film, as compared to what it would be without the filler. The nano-composite film may have a specific tensile strength that is greater than 1 GPa/g/cm$^3$, a specific Young's modulus that is greater than 100 GPa/g/ccm$^3$, or both. Tensile strength and modulus values of up to 3.7 GPa/g/cm$^3$ and 125 GPa/g/cm$^3$, respectively, have been demonstrated. The film may be formed by combining powdered filler and polymer matrix powder in a solvent (e.g., decalin), high-shear extruding the resulting solution to disentangle the polymer chains and exfoliate the filler, freezing the solution to form a solid film, and then drawing the film.

20 Claims, 15 Drawing Sheets

(56) References Cited

U.S. PATENT DOCUMENTS

| | | |
|---|---|---|
| 7,041,372 B2 | 5/2006 | Rhoads et al. |
| 7,226,071 B2 | 6/2007 | Garcin et al. |
| 7,284,726 B2 | 10/2007 | Fabian et al. |
| 7,291,373 B2 | 11/2007 | Bartley-Cho et al. |
| 7,320,832 B2 | 1/2008 | Palumbo et al. |
| 7,549,366 B2 | 6/2009 | Park et al. |
| 7,799,710 B1 | 9/2010 | Tan |
| 7,824,774 B2 | 11/2010 | Palumbo et al. |
| 7,827,898 B2 | 11/2010 | Park et al. |
| 7,832,983 B2 | 11/2010 | Kruckenberg et al. |
| 7,845,265 B1 | 12/2010 | Park et al. |
| 7,910,224 B2 | 3/2011 | Palumbo et al. |
| 7,959,972 B2 | 6/2011 | Maganas |
| 7,964,266 B2 | 6/2011 | Harding et al. |
| 7,964,267 B1 | 6/2011 | Lyons et al. |
| 7,993,715 B2 | 8/2011 | Geva et al. |
| 8,017,529 B1 | 9/2011 | Arvidson et al. |
| 8,065,947 B2 | 11/2011 | Park et al. |
| 8,128,778 B2 | 3/2012 | Geva et al. |
| 8,162,260 B2 | 4/2012 | Maganas |
| 8,225,704 B2 | 7/2012 | Ogrin et al. |
| 8,287,987 B1 | 10/2012 | Lyons et al. |
| 8,517,300 B2 | 8/2013 | Simmons et al. |
| 8,535,777 B2 | 9/2013 | Marissen et al. |
| 8,561,934 B2 | 10/2013 | Kruckenberg et al. |
| 8,584,570 B1 | 11/2013 | Ogrin et al. |
| 8,598,057 B1 | 12/2013 | Speyer |
| 8,709,575 B2 | 4/2014 | Marissen et al. |
| 8,800,911 B2 | 8/2014 | Kruckenberg et al. |
| 8,932,720 B2 | 1/2015 | Dornbusch et al. |
| 9,046,324 B2 | 6/2015 | Bergman et al. |
| 9,328,788 B2 | 5/2016 | Greenhill et al. |
| 9,382,117 B2 | 7/2016 | Zhamu et al. |
| 9,394,959 B2 | 7/2016 | Nauman et al. |
| 9,518,160 B2 | 12/2016 | Humfeld |
| 9,625,237 B2 | 4/2017 | Marissen et al. |
| 9,696,122 B2 | 7/2017 | Bergman et al. |
| 9,850,596 B2 | 12/2017 | Dang et al. |
| 9,863,742 B2 | 1/2018 | Marissen et al. |
| 9,903,689 B2 | 2/2018 | Marissen et al. |
| 9,963,562 B2 | 5/2018 | Humfeld |
| 9,981,446 B2 | 5/2018 | Holemans |
| 9,982,736 B2 | 5/2018 | Greenhill et al. |
| 10,005,099 B2 * | 6/2018 | Lin .......... B05D 3/007 |
| 10,048,046 B1 | 8/2018 | Iliev |
| 10,053,203 B2 | 8/2018 | Holemans et al. |
| 10,184,759 B2 | 1/2019 | Wadley et al. |
| 10,233,086 B2 | 3/2019 | Jiang et al. |
| 10,266,677 B2 | 4/2019 | Humfeld |
| 10,329,391 B2 * | 6/2019 | Nosker .......... C08K 3/042 |
| 10,442,559 B2 | 10/2019 | Dong et al. |
| 10,598,465 B2 | 3/2020 | Geva et al. |
| 10,775,137 B2 | 9/2020 | Ganor |
| 10,926,513 B2 | 2/2021 | Greenhill |
| 11,008,436 B2 | 5/2021 | Anzelmo et al. |
| 11,174,366 B2 | 11/2021 | Nosker et al. |
| 2005/0066805 A1 | 3/2005 | Park et al. |
| 2005/0178883 A1 | 8/2005 | Goodworth et al. |
| 2006/0008637 A1 | 1/2006 | Geissbuhler |
| 2006/0030226 A1 | 2/2006 | Park et al. |
| 2006/0248854 A1 | 11/2006 | Bartley-Cho et al. |
| 2007/0110977 A1 | 5/2007 | Al-Haik et al. |
| 2007/0197710 A1 * | 8/2007 | Wu .......... B32B 27/08 428/327 |
| 2008/0107805 A1 | 5/2008 | Palumbo et al. |
| 2008/0254310 A1 | 10/2008 | Palumbo et al. |
| 2008/0283667 A1 | 11/2008 | Darrow |
| 2009/0004413 A1 | 1/2009 | Wagner et al. |
| 2010/0015418 A1 | 1/2010 | Holzer et al. |
| 2010/0112322 A1 * | 5/2010 | Kumar .......... D01F 1/10 977/840 |
| 2010/0196611 A1 * | 8/2010 | Phonthammachai .......... B29C 70/025 427/386 |
| 2010/0239808 A1 | 9/2010 | Schwitter |
| 2010/0297388 A1 | 11/2010 | Dagher et al. |
| 2011/0001086 A1 | 1/2011 | Kruckenberg et al. |
| 2011/0294594 A1 | 12/2011 | Palumbo et al. |
| 2012/0024138 A1 | 2/2012 | Carberry et al. |
| 2012/0148789 A1 | 6/2012 | Hallander et al. |
| 2013/0143048 A1 | 6/2013 | Kim et al. |
| 2013/0273341 A1 | 10/2013 | Albertelli et al. |
| 2014/0011969 A1 | 1/2014 | Panchapakesan |
| 2014/0047710 A1 | 2/2014 | Simmons et al. |
| 2015/0237929 A1 | 8/2015 | Greenhill et al. |
| 2015/0321408 A1 | 11/2015 | Chen et al. |
| 2016/0032061 A1 * | 2/2016 | Clauss .......... C08J 5/005 524/514 |
| 2016/0032062 A1 * | 2/2016 | Clauss .......... C08J 3/201 523/468 |
| 2016/0046523 A1 * | 2/2016 | Chen .......... C09D 5/00 427/389.7 |
| 2016/0200882 A1 | 7/2016 | Bhat et al. |
| 2017/0021387 A1 | 1/2017 | Lin et al. |
| 2017/0191803 A1 | 7/2017 | Price et al. |
| 2018/0043660 A1 | 2/2018 | Kang et al. |
| 2018/0354785 A1 | 12/2018 | Kinloch et al. |
| 2019/0025015 A1 | 1/2019 | Davis et al. |
| 2019/0128357 A1 | 5/2019 | Greenhill et al. |
| 2019/0233611 A1 | 8/2019 | Nosker et al. |
| 2020/0017645 A1 | 1/2020 | Nosker et al. |
| 2021/0078309 A1 | 3/2021 | Chen et al. |
| 2021/0179807 A1 | 6/2021 | Ren et al. |
| 2021/0197518 A1 | 7/2021 | Greenhill et al. |

FOREIGN PATENT DOCUMENTS

| | | | |
|---|---|---|---|
| WO | 2014055258 A1 | 4/2014 | |
| WO | 2016005504 A1 | 1/2016 | |
| WO | 2016018995 A1 | 2/2016 | |
| WO | WO-2016138572 A1 * | 9/2016 | .......... B82Y 30/00 |
| WO | 2018045671 A1 | 3/2018 | |
| WO | 2020/201502 A1 | 10/2020 | |

OTHER PUBLICATIONS

Xu et al (Carbon; vol. 47; pp. 3538-3543) (Year: 2009).*

Shan Cheng, Xi Chen, Y. Grace Hsuan, and Christopher Y. Li Macromolecules 2012 45 (2), 993-1000.

Shen S, Henry A, Tong J, Zheng R, Chen G. Polyethylene nanofibres with very high thermal conductivities. Nat Nanotechnol. Apr. 2010;5(4):251-5. doi: 10.1038/nnano.2010.27. Epub Mar. 7, 2010.

Shilun Ruan, Ping Gao, T.X. Yu, Ultra-strong gel-spun UHMWPE fibers reinforced using multiwalled carbon nanotubes, Polymer, vol. 47, Issue 5,2006, pp. 1604-1611.

Shrestha, R., Li, P., Chatterjee, B. et al. Crystalline polymer nanofibers with ultra-high strength and thermal conductivity. Nat Commun 9, 1664 (2018).

Song, K., Zhang, Y., Meng, J. and Minus, M.L. (2013), Lubrication of poly(vinyl alcohol) chain orientation by carbon nano-chips in composite tapes. J. Appl. Polym. Sci., 127: 2977-2982.

Strength and Breaking Mechanism of Multiwalled Carbon Nanotubes Under Tensile Load by Min-Feng Yu, Oleg Lourie, Mark J. Dyer, Katerina Moloni, Thomas F. Kelly, Rodney S. Ruoff Science Jan. 28, 2000 : 637-640.

Sun, H., Jin, Z., Yang, C. et al. Compass II: extended coverage for polymer and drug-like molecule databases. J Mol Model 22, 47 (2016). https://doi.org/10.1007/s00894-016-2909.

Superior thermal conductivity and extremely high mechanical strength in polyethylene chains from ab initio calculation Jin-Wu Jiang1, Junhua Zhao1, Kun Zhou2, and Timon Rabczuk1 Journal of Applied Physics 111:12.

The crystal structure of long-chain normal paraffin hydrocarbons. The "shape" of the <CH2 group, C. W. Bunn, Transactions of the Faraday Society vol. 35, 1939.

Thomas C. O'Connor and Mark O. Robbins, ACS Macro Letters 2016 5 (3), 263-267.

Toshio Kunugi, Sachio Oomori, Shinya Mikami, Preparation of ultra-high modulus polyethylene films by the zone-annealing method, Polymer, vol. 29, Issue 5, 1988, pp. 814-820.

(56) References Cited

OTHER PUBLICATIONS

Toshio Kunugi, Tomohiro Hayakawa, Atsushi Mizushima, Preparation of high modulus and high strength PEEK film by the zone drawing/annealing method, Polymer, vol. 32, Issue 5, 1991, pp. 808-813.
W. Feng, X.D. Bai, Y.Q. Lian, J. Liang, X.G. Wang, K. Yoshino, Well-aligned polyaniline/carbon-nanotube composite films grown by in-situ aniline polymerization, Carbon, vol. 41, Issue 8, 2003, pp. 1551-1557.
Weizhao Hu, Jing Zhan, Xin Wang, Ningning Hong, Bibo Wang, Lei Song, Anna A Stec, T. Richard Hull, Jian Wang, and Yuan Hu Industrial & Engineering Chemistry Research 2014 53 (8), 3073-3083.
X. P. Chen, C. A. Yuan, C. K.Y. Wong, S. W. Koh & G. Q. Zhang (2011) Validation of forcefields in predicting the physical and thermophysical properties of emeraldine base polyaniline, Molecular Simulation, 37:12, 990-996.
Xiefei Zhang, Tao Liu, T. V. Sreekumar, Satish Kumar, Valerie C. Moore, Robert H. Hauge, and Richard E. Smalley, Nano Letters 2003 3 (9), 1285-1288.
Xu, Y., Kraemer, D., Song, B. et al. Nanostructured polymer films with metal-like thermal conductivity. Nat Commun 10, 1771 (2019). preprint at arXiv: 1708.06416 2017.
Xuqiang Ji, Yuanhong Xu, Wenling Zhang, Liang Cui, Jingquan Liu, Review of functionalization, structure and properties of graphene/polymer composite fibers, Composites Part A: Applied Science and Manufacturing, vol. 87, 2016, pp. 29-45.
Yao, J.; Bastiaansen, C.W.M.; Peijs, T. High Strength and High Modulus Electrospun Nanofibers. Fibers 2014, 2, 158-186.
Yaodong Liu and Satish Kumar, ACS Applied Materials & Interfaces 2014 6 (9), 6069-6087.
Yi Lin, John W. Connell, Nanoscale, 2012,4, 6908-6939.
Z. Wang et al 2007 Nanotechnology 18 455709.
Zhi Guo, Doyun Lee, Yi Liu, Fangyuan Sun, Anna Sliwinski, Haifeng Gao, Peter C. Burns, Libai Huange and Tengfei Luo, Tuning the thermal conductivity of solar cell polymers through side chain engineering, Physical Chemistry Chemical Physics, Issue 17, 2014.
Zhu, Y., James, D.K. and Tour, J.M. (2012), New Routes to Graphene, Graphene Oxide and Their Related Applications. Adv. Mater., 24: 4924-4955.
Zhu, Y., Murali, S., Cai, W., Li, X., Suk, J.W., Potts, J.R. and Ruoff, R.S. (2010), Graphene and Graphene Oxide: Synthesis, Properties, and Applications. Adv. Mater., 22: 3906-3924.
Amnaya P Awasthi et al 2008 Modelling Simul. Mater. Sci. Eng. 17 015002.
Atomistic simulations of nanotube fracture T. Belytschko, S. P. Xiao, G. C. Schatz, and R. S. Ruoff Phys. Rev. B 65, 235430 (2002). Published Jun. 20, 2002.
Carbon Sheets an Atom Thick Give Rise to Graphene Dreams by Robert F. Service Science May 15, 2009 : 875-877.
Direct correlation between modulus and the crystalline structure in isotactic polypropylene, A. Menyhard, P. Suba, Zs. Laszlo, H. M. Fekete, A. O. Mester, Zs. Horvath, Gy. Voros, J. Varga, J. Moczo, Express Polymer Letters 2015, 9(3), 308-320.
Dmitri Golberg, Yoshio Bando, Yang Huang, Takeshi Terao, Masanori Mitome, Chengchun Tang, and Chunyi Zhi ACS Nano 2010 4 (6), 2979-2993.
Elizabeth J. Duplock, Matthias Scheffler, and Philip J. D. Lindan Phys. Rev. Lett. 92, 225502, Published Jun. 3, 2004.
Gao J, Itkis ME, Yu A, Bekyarova E, Zhao B, Haddon RC. Continuous spinning of a single-walled carbon nanotube-nylon composite fiber. J Am Chem Soc. Mar. 2, 20053;127(11):3847-54.
Han Gi Chae, Marilyn L. Minus, Satish Kumar, Oriented and exfoliated single wall carbon nanotubes in polyacrylonitrile, Polymer, vol. 47, Issue 10, 2006, pp. 3494-3504.
Hannes C. Schniepp, Je-Luen Li, Michael J. McAllister, Hiroaki Sai, Margarita Herrera-Alonso, Douglas H. Adamson, Robert K. Prud'homme, Roberto Car, Dudley A. Saville, and Ilhan A. Aksay The Journal of Physical Chemistry B 2006 110 (17), 8535-8539.
Hu X, Xu Z, Liu Z, Gao C. Liquid crystal self-templating approach to ultrastrong and tough biomimic composites. Sci Rep. 2013;3:2374.
Huibin Chang, Jeffrey Luo, Prabhakar V. Gulgunje, Satish Kumar Annual Review of Materials Research 2017 47:1, 331-359.
Hyunsoo Kim, Rouhollah Jalili, Geoffrey M. Spinks, Gordon G. Wallace, Seon Jeong Kim, High-strength graphene and polyacrylonitrile composite fiber enhanced by surface coating with polydopamine, Composites Science and Technology, vol. 149, 2017, pp. 280-285.
Hyunwoo Kim, Ahmed A. Abdala, and Christopher W. Macosko Macromolecules 2010 43 (16), 6515-6530.
Hyunwoo Kim, Shingo Kobayashi, Mohd A. AbdurRahim, Minglun J. Zhang, Albina Khusainova, Marc A. Hillmyer, Ahmed A. Abdala, Christopher W. Macosko, Graphene/polyethylene nanocomposites: Effect of polyethylene functionalization and blending methods, Polymer, vol. 52, Issue 8, 2011, pp. 1837-1846.
J. H. Park, G. C. Rutledge, Macromolecules 2017, 50, 15, 5627-5642, Jul. 28, 2017.
J. Tersoff, Phys. Rev. B 39, 5566(R)—Published Mar. 15, 1989; Erratum Phys. Rev. B 41, 3248 (1990).
Jalili, R., Aboutalebi, S.H., Esrafilzadeh, D., Shepherd, R.L., Chen, J., Aminorroaya-Yamini, S., Konstantinov, K., Minett, A.I., Razal, J.M. and Wallace, G.G. (2013), Scalable One-Step Wet-Spinning of Graphene Fibers and Yarns from Liquid Crystalline Dispersions of Graphene Oxide: Towards Multifunctional Textiles. Adv. Funct. Mater., 23: 5345-5354.
James Loomis, Hadi Ghasemi, Xiaopeng Huang, Nagarajan Thoppey, Jianjian Wang, Jonathan K. Tong, Yanfei Xu, Xiaobo Li, Cheng-Te Lin and Gang Chen, Continuous fabrication platform for highly aligned polymer films, Technology 2014 02:03, 189-199.
Jiang, Z, Li, Q, Chen, M, Li, J, Li, J, Huang, Y, Besenbacher, F & Dong, M 2013, 'Mechanical reinforcement fibers produced by gel-spinning of poly-acrylic acid (PAA) and graphene oxide (GO) composites', Nanoscale, vol. 5, No. 14, pp. 6265-6269.
Junlong Yang, Yajiang Huang, Yadong Lv, Songrong Li, Qi Yang, Guang xian Li, The synergistic mechanism of thermally reduced graphene oxide and antioxidant in improving the thermo-oxidative stability of polypropylene, Carbon vol. 89, Aug. 2015, pp. 340-349.
Junlong Yang, Yunsong Pang, Weixin Huang, Scott K. Shaw, Jarrod Schiffbauer, Michelle Anne Pillers, Xin Mu, Shirui Luo, Teng Zhang, Yajiang Huang, Guangxian Li, Sylwia Ptasinska, Marya Lieberman, and Tengfei Luo ACS Nano 2017 11 (6), 5510-5518.
Kesong Hu, Dhaval D. Kulkarni, Ikjun Choi, Vladimir V. Tsukruk, Graphene-polymer nanocomposites for structural and functional applications, Progress in Polymer Science, vol. 39, Issue 11, 2014, pp. 1934-1972.
Krzysztof Koziol, Juan Vilatela, Anna Moisala, Marcelo Motta, Philip Cunniff, Michael Sennett, Alan Windle, Science Dec. 21, 2007 : 1892-1895.
Kuila, Tapas & Bhadra, Sambhu & Yao, Dahu & Kim, Nam Hoon & Bose, Saswata & Lee, Joong. (2010). Recent Advances in Graphene Based Polymer Composites. Progress in Polymer Science. 35. 1350-1375. 10.1016/j.progpolymsci.2010.07.005.
L. Kou, C. Gao, Nanoscale, 2013,5, 4370-4378.
Lee C, Wei X, Kysar JW, Hone J. Measurement of the elastic properties and intrinsic strength of monolayer graphene. Science. Jul. 18, 2008;321(5887):385-8.
Li, P., Hu, L., McGaughey, A.J.H. and Shen, S. (2014), Crystalline Polyethylene Nanofibers with the Theoretical Limit of Young's Modulus. Adv. Mater., 26: 1065-1070.
Li, Y., Zhu, H., Zhu, S. et al. Hybridizing wood cellulose and graphene oxide toward high-performance fibers. NPG Asia Mater 7, e150 (2015).
Luc Langer, Denis Billaud, Jean-Paul Issi, Thermal conductivity of stretched and annealed poly (p-phenylene sulfide) films, Solid State Communications, vol. 126, Issue 6, 2003, pp. 353-357.
Luo, T. and Lloyd, J.R. (2012), Enhancement of Thermal Energy Transport Across Graphene/Graphite and Polymer Interfaces: A Molecular Dynamics Study. Adv. Funct. Mater., 22: 2495-2502.
M. El Achaby, A. Qaiss, Processing and properties of polyethylene reinforced by graphene nanosheets and carbon nanotubes, Materials & Design, vol. 44, 2013, pp. 81-89.

(56) References Cited

OTHER PUBLICATIONS

Marilyn L. Minus, Han Gi Chae, Satish Kumar, Single wall carbon nanotube templated oriented crystallization of poly(vinyl alcohol), Polymer vol. 47, Issue 11, May 17, 2006, pp. 3705-3710.

Meng, J., Tajaddod, N., Cranford, S.W. and Minus, M.L. (2015), Polyethylene-Assisted Exfoliation of Hexagonal Boron Nitride in Composite Fibers: A Combined Experimental and Computational Study. Macromol. Chem. Phys., 216: 847-855.

Michael J. McAllister, Je-Luen Li, Douglas H. Adamson, Hannes C. Schniepp, Ahmed A. Abdala, Jun Liu, Margarita Herrera-Alonso, David L. Milius, Roberto Car, Robert K. Prud'homme, and Ilhan A. Aksay, Chemistry of Materials 2007 19 (18), 4396-4404.

Minus, M.L., Chae, H.G. and Kumar, S. (2009), Interfacial Crystallization in Gel-Spun Poly(vinyl alcohol)/Single-Wall Carbon Nanotube Composite Fibers. Macromol. Chem. Phys., 210: 1799-1808.

Minus, M.L., Chae, H.G. and Kumar, S. (2010), Observations on Solution Crystallization of Poly(vinyl alcohol) in the Presence of Single-Wall Carbon Nanotubes. Macromol. Rapid Commun., 31: 310-316.

Mittal, V., Luckachan, G.E. and Matsko, N.B. (2014), PE/Chlorinated-PE Blends and PE/Chlorinated-PE/Graphene Oxide Nanocomposites: Morphology, Phase Miscibility, and Interfacial Interactions. Macromol. Chem. Phys., 215: 255-268.

Nguyen, D.A., Lee, Y.R., Raghu, A.V., Jeong, H.M., Shin, C.M. and Kim, B.K. (2009), Morphological and physical properties of a thermoplastic polyurethane reinforced with functionalized graphene sheet. Polym. Int., 58: 412-417.

Pang et al. RSC Adv., 2015,5, 63063-63072.

Paul Smith, Piet J. Lemstra, Ultra-high strength polyethylene filaments by solution spinning/drawing. 3. Influence of drawing temperature, Polymer, vol. 21, Issue 11, 1980, pp. 1341-1343.

Pawley, G.S. (1981), Unit-cell refinement from powder diffraction scans. J. Appl. Cryst., 14: 357-361.

Pérez-Rigueiro, J., Viney, C., Llorca, J. and Elices, M., Silkworm silk as an engineering material. Journal of Applied Polymer Science, vol. 70, 2439-2447 (1998).

R Andrews, M.C Weisenberger, Carbon nanotube polymer composites, Current Opinion in Solid State and Materials Science, vol. 8, Issue 1, 2004, pp. 31-37.

Rafiee MA, Rafiee J, Wang Z, Song H, Yu ZZ, Koratkar N. Enhanced mechanical properties of nanocomposites at low graphene content. ACS Nano. Dec. 22, 2009;3(12):3884-90.

Rajendra K. Krishnaswamy, Jay Janzen, Exploiting refractometry to estimate the density of polyethylene: The Lorentz-Lorenz approach re-visited, Polymer Testing, vol. 24, Issue 6, 2005, pp. 762-765.

Ramanathan, T., Abdala, A., Stankovich, S. et al. Functionalized graphene sheets for polymer nanocomposites. Nature Nanotech 3, 327-331 (2008).

Reina A, Jia X, Ho J, Nezich D, Son H, Bulovic V, Dresselhaus MS, Kong J. Large area, few-layer graphene films on arbitrary substrates by chemical vapor deposition. Nano Lett. Jan. 2009;9(1):30-5.

Sankar C Khatua, Sukumar Maiti, High performance polymer films 4. Mechanical behavior, European Polymer Journal, vol. 38, Issue 3, 2002, pp. 537-543.

Satish Kumar, Thuy D. Dang, Fred E. Arnold, Arup R. Bhattacharyya, Byung G. Min, Xiefei Zhang, Richard A. Vaia, Cheol Park, W. Wade Adams, Robert H. Hauge, Richard E. Smalley, Sivarajan Ramesh, and Peter A. Willis Macromolecules 2002 35 (24), 9039-9043.

International Search Report and Written Opinion issued in PCT/IB2019/055652 mailed on Nov. 19, 2019.

Asafen "Polyethylene/Graphene Nanocomposites" The Petroleum Institute, 2015, pp. 1-85.

Shah "Exfoliation of Graphene and its Application as Filler in Reinforced Polymer Nanocomposites" Nano Hybrids and Composites, 2016, vol. 11, pp. 7-21.

Kang Guo, "Graphene oxide as an anti-shrinkage additive for resorcinol-formaldehyde composite aerogels," Physical Chemistry Chemical Physics, Feb. 10, 2014, pp. 11603-11608, vol. 16.

\* cited by examiner

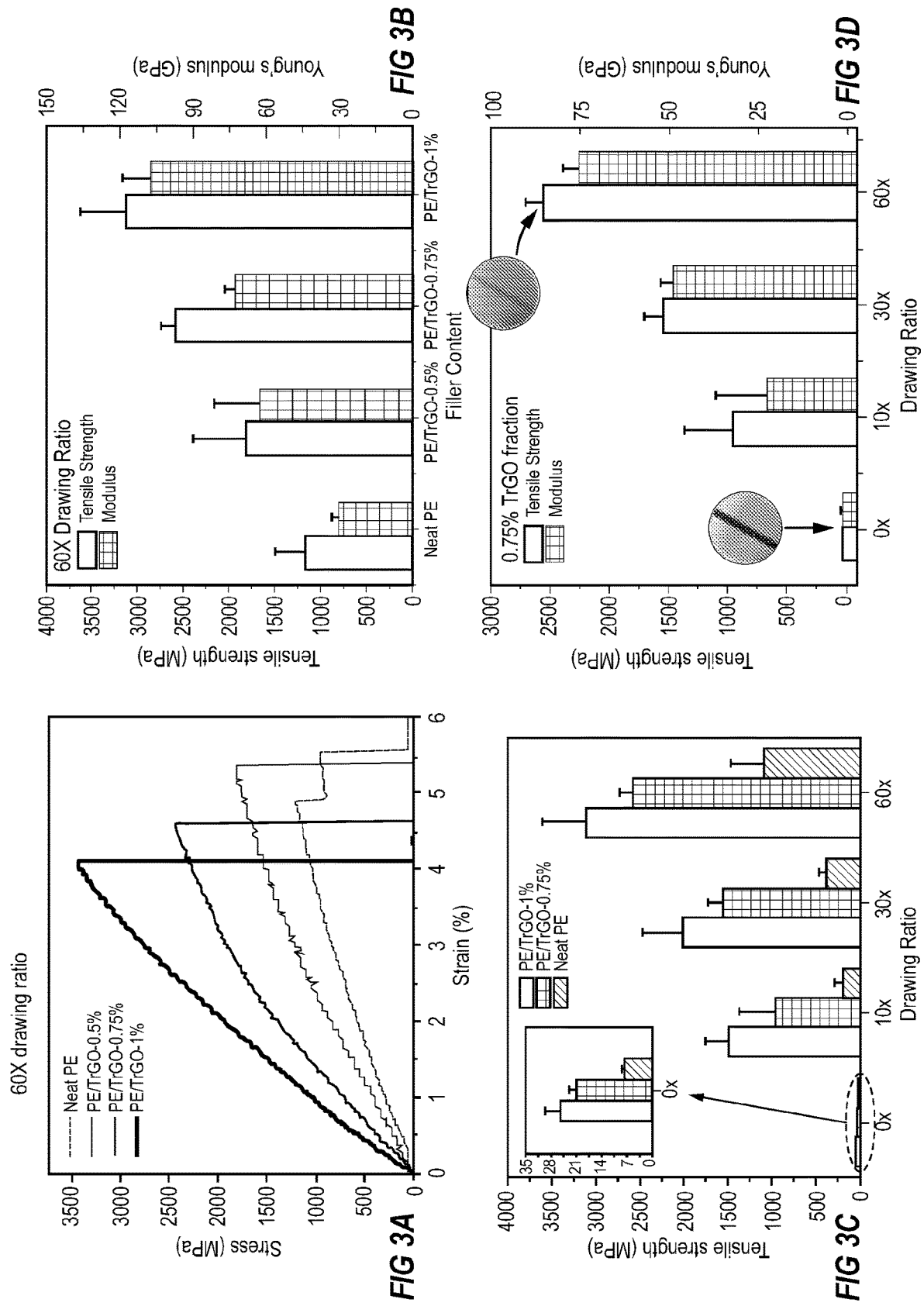

FIG. 4A 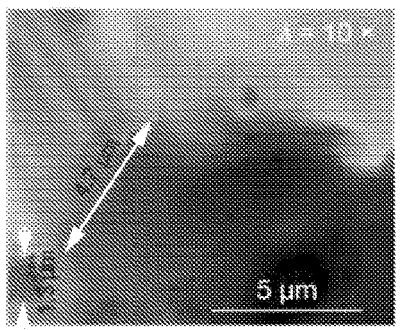 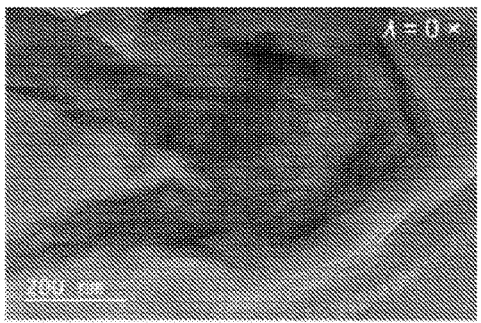 FIG. 4D
FIG. 4B 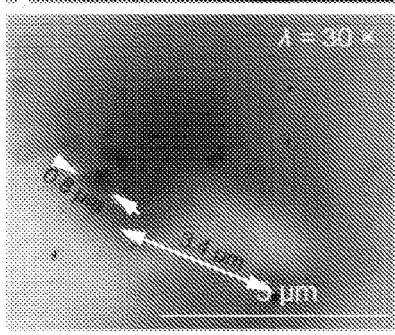 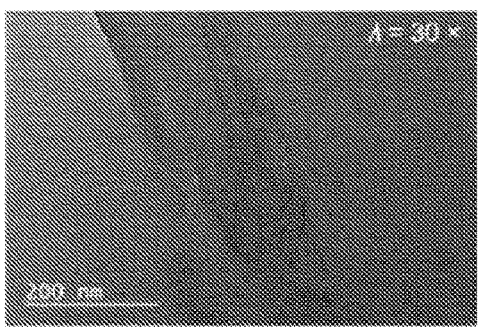 FIG. 4E
FIG. 4C 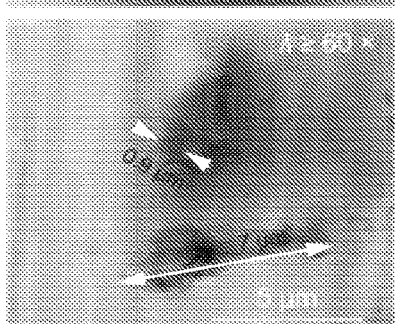 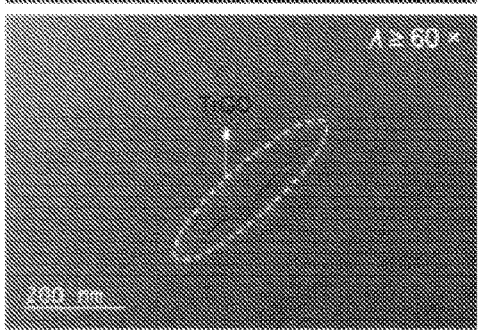 FIG. 4F ↓ Steered Move ↓ Steered Move

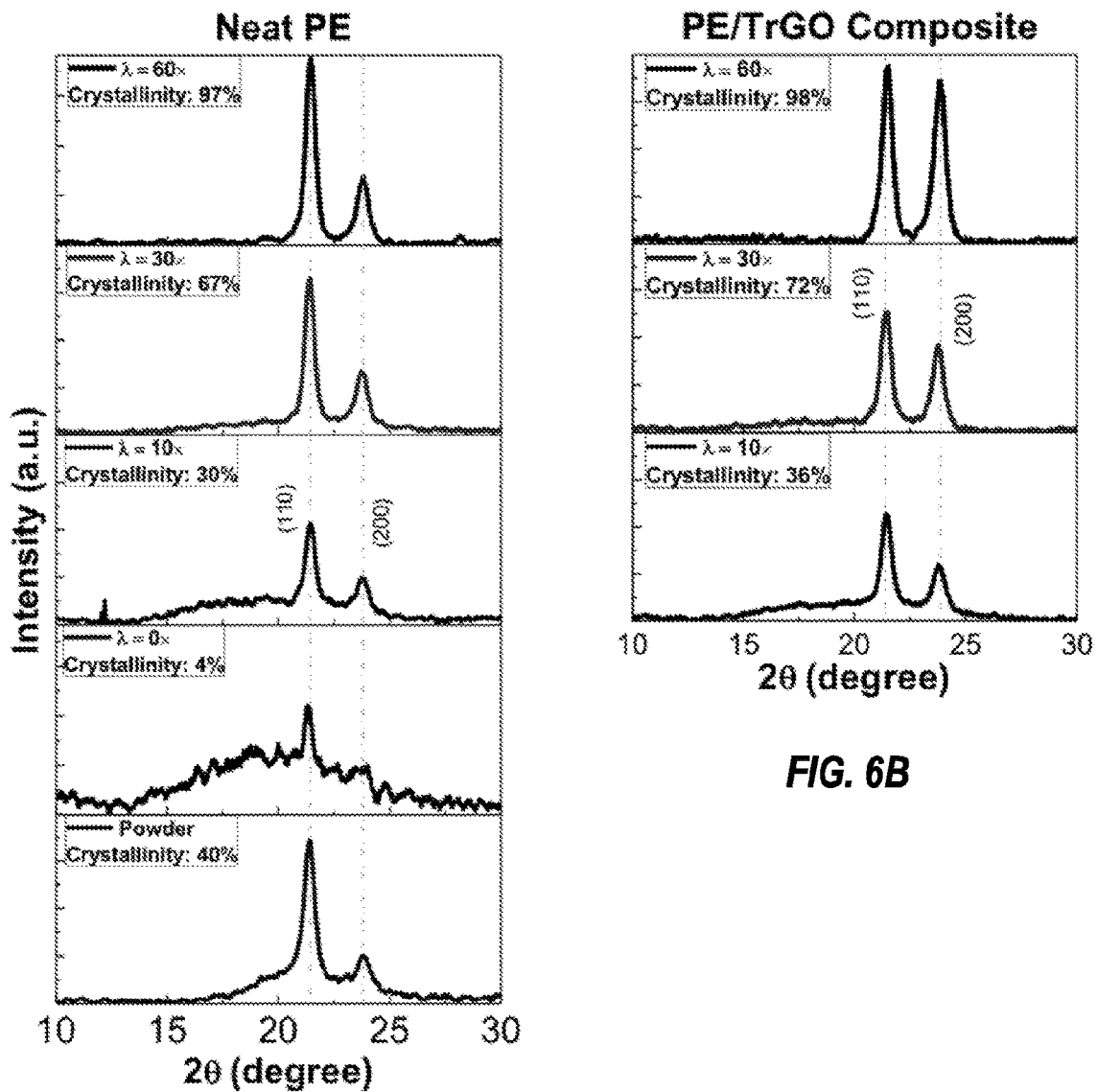
FIG. 6A
FIG. 6B
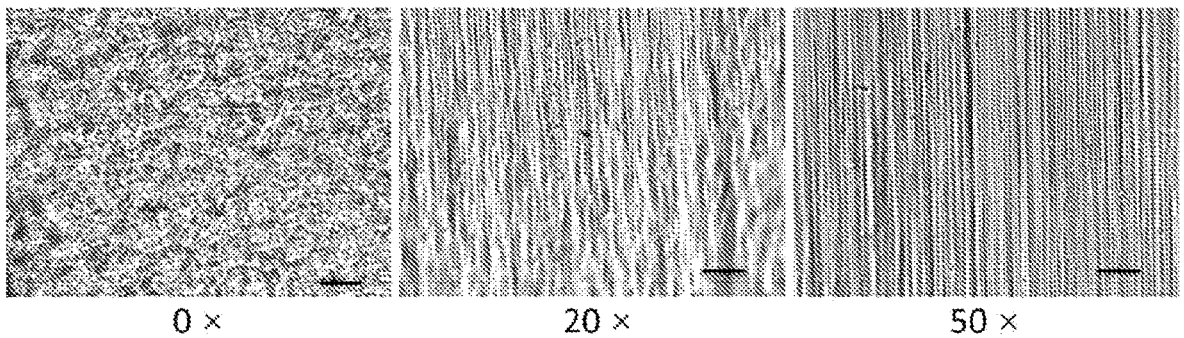
FIG. 7A  FIG. 7B  FIG. 7C

POLYMER/EXFOLIATED NANO-COMPOSITE FILMS WITH SUPERIOR MECHANICAL PROPERTIES

CROSS-REFERENCE TO RELATED APPLICATION

The present application claims priority to PCT Application No. PCT/IB2019/055652 filed Jul. 2, 2019, entitled "POLYMER/EXFOLIATED NANO-COMPOSITE FILMS WITH SUPERIOR MECHANICAL PROPERTIES", which claims the benefit of U.S. Provisional Patent Application No. 62/693,656 filed Jul. 3, 2018, entitled "GRAPHENE NANOCOMPOSITE FILM," and U.S. Provisional Patent Application No. 62/776,813 filed Dec. 7, 2018, entitled "POLYMER/EXFOLIATED FILLER NANO-COMPOSITE FILMS WITH SUPERIOR MECHANICAL PROPERTIES,". All the aforementioned applications are incorporated by reference herein in their entirety.

BACKGROUND OF THE INVENTION

1. The Field of the Invention

The present invention is in the field of composite materials, particularly nano-composite polymer films.

2. The Relevant Technology

Lightweight polymers with superior mechanical properties are desirable in many applications, such as structural materials, ballistic protection, packaging and the like. Ultra-high specific tensile strengths (~1.5–4.5 GPa/g/cm$^3$) have been reported for some polymer fibers in which the morphology of the polymer fiber is carefully engineered to ensure that the fiber is highly crystalline. These commercially available fiber products are exemplified by DYNEEMA, SPECTRA, KEVLAR and ZYLON fiber products. The crystalline fibers leverage the strong intra-chain covalent bonds along the polymer chains to transfer load, in contrast to amorphous phase structures, where defects exist, and where load is transferred mainly by relatively weaker inter-chain van der Waals interactions.

While polymer films can be fabricated in a higher mass production rate as compared to fibers, they also exhibit far lower mechanical properties. In other words, the ultra-high mechanical properties have only been realized in fiber forms, due to difficulties in producing films that might have similar strength and stiffness characteristics. It would be an advancement in the art to provide polymer films that might provide ultra-high specific tensile strength and/or specific stiffness, and methods for their manufacture.

BRIEF SUMMARY OF THE INVENTION

The present invention is directed to nano-composite films and methods for their manufacture. The nano-composite films include a polymer matrix (e.g., polyethylene, polypropylene or the like) and a graphene or other filler similarly capable of exfoliation (e.g., thermally reduced graphene oxide ("TrGO"), hexagonal boron nitride, or the like) in the polymer matrix. The filler may be in the form of very small (e.g., less than 100 μm, less than 50 μm, less than 30 μm, less than 25 μm or less than 10 μm) flakes or other shaped particles of graphene or other filler. The nano-composite film can have a specific tensile strength that is greater than 1 GPa/g/cm$^3$, or greater than 1.2 GPa/g/cm$^3$ (preferably greater than 2.5 GPa/g/cm$^3$), a specific Young's modulus that is greater than 100 GPa/g/cm$^3$, or both.

A method of producing the nano-composite film may include combining graphene powder or other powdered filler (e.g., thermally or chemically reduced graphene oxide or functionalized graphene oxide) and a polymer matrix powder in a solvent to form a solution. The solution may be mixed by applying ultrasonic energy thereto (or other processes such as magnetic stirring), aiding to uniformly mix, and even exfoliate the graphene or other powder filler to some degree. For example, such sonication or other mixing may cause cleavage along the planar sheets of the individually stacked layers of the graphene powder or other filler, further reducing the thickness of the graphene filler powder particles (e.g., flakes). This exfoliation of the graphene or other filler is important in ensuring good dispersion of the graphene or other with the polymer, and in reducing the particle size of the filler, increasing available surface area of the filler for interaction with the polymer matrix. Further exfoliation can be achieved in subsequent steps following preparation of the initial solution, as well. After the solution is prepared, the solution is extruded (e.g., under high shear) in a manner that results in additional exfoliation of the graphene or other filler, as well as disentanglement of the polymer chains of the polymer. The extruded solution is frozen, e.g., using liquid $N_2$ or the like, onto a substrate or in a cold bath, and dried. This ensures that the solvent that may have been initially present is removed, leaving a solid film of the polymer matrix with graphene or other filler dispersed therein. The solid film may then be drawn (e.g., hot drawn), further exfoliating the graphene or other filler and increasing the crystallinity of the polymer matrix, resulting in the finished nano-composite film.

The film is described as a nano-composite as the graphene or other filler disposed therein is very thin in thickness. For example, at maximum exfoliation, the graphene or other filler may substantially represent a 2D material, with as little as a single atomic layer of carbon atoms (in the case of graphene) arranged in the characteristic hexagonal lattice structure. In some instances, the graphene or other filler is as thin as about 0.6 nm. It will be appreciated that such maximum exfoliation may not always be achieved, e.g., such that the graphene or other filler may include a plurality of such atomic layer "sheets" one over the other (e.g., from 2 to 20, from 2 to 10 or from 2 to 5 such layers). While the graphene powder may initially be black or gray in color, during the process, due to exfoliation and particle size reduction, the graphene filler becomes less noticeable visually, so that the finished film is often optically clear (e.g., transparent) or at least translucent.

The film provides very high tensile strength and stiffness in the machine direction, e.g., specific tensile strength (i.e., tensile strength divided by composite density) may be at least 1 GPa/g/cm$^3$, or at least 1.2 GPa/g/cm$^3$. Specific Young's modulus, a standard measure of stiffness (Young's modulus divided by composite density), may be at least 100 GPa/g/cm$^3$. Similarly high values may be provided for absolute tensile strength and/or Young's modulus.

The present materials are films rather than fibers or other geometries. For example, by "film", it will be understood that the structure is a substantially 2-D sheet, i.e., in which the thickness of the film is very small compared to length and width dimensions. For example, the thickness may typically be less than 1000 microns, more typically less than 100 microns, while the width dimension will be greater than 1 mm, greater than 2 mm, greater than 3 mm, greater than 5 mm, greater than 10 mm, etc. Often films may have a thickness of 10 to 80 microns, while the width may be greater than 10 mm, greater than 10 cm, 1 m, or more. Such films may be continuous, so as to have any desired length (e.g., typically larger, sometimes far larger, than the width, such as 5 cm, 10 cm, 1 m, 10 m, 100 m, or even greater.) The materials present in the films (e.g., the polymer and/or the filler) may therefore not be present as filaments, or fibrous in nature, as is the case in fiber materials.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

FIG. 1AA charts similar data as in FIG. 1A, but is shown as absolute tensile strength and absolute Young's modulus values.

FIG. 1BB charts similar data as in FIG. 1B, but is shown as absolute tensile strength and absolute Young's modulus values.

FIG. 3A shows stress/strain curves for tested nano-composites according to the present invention at different filler fractions, as compared to the polymer alone.

FIG. 3B shows tensile strength and Young's modulus values for the same materials as shown in FIG. 3A.

FIG. 3C shows tensile strength values for different drawing ratios for a sample including 0.75% graphene as compared to the polymer alone.

FIG. 3D shows tensile strength and Young's modulus values for a sample including 0.75% graphene at different drawing ratios.

FIG. 4A is an SEM image of a sample composite at a 10× drawing ratio.

FIG. 4B is an SEM image of a sample composite at a 30× drawing ratio.

FIG. 4C is an SEM image of a sample composite at a 60× drawing ratio.

FIG. 4D is a TEM image of a sample composite at a 0× drawing ratio.

FIG. 4E is a TEM image of a sample composite at a 30× drawing ratio.

FIG. 4F is an TEM image of a sample composite at a 60× drawing ratio.

FIG. 6A shows wide angle x-ray diffraction spectra for neat polyethylene at different drawing ratios.

FIG. 6B shows wide angle x-ray diffraction spectra for various prepared polymer/graphene nano-composite films at different drawing ratios.

FIGS. 7A-7C show optical microscope images of prepared composite films, shown at 0× draw (FIG. 7A), 20× draw (FIG. 7B), and 50× draw (FIG. 7C). In these images, the scale bar is 20 µm.

DETAILED DESCRIPTION OF THE PREFERRED EMBODIMENTS

I. Definitions

Figure 1A:
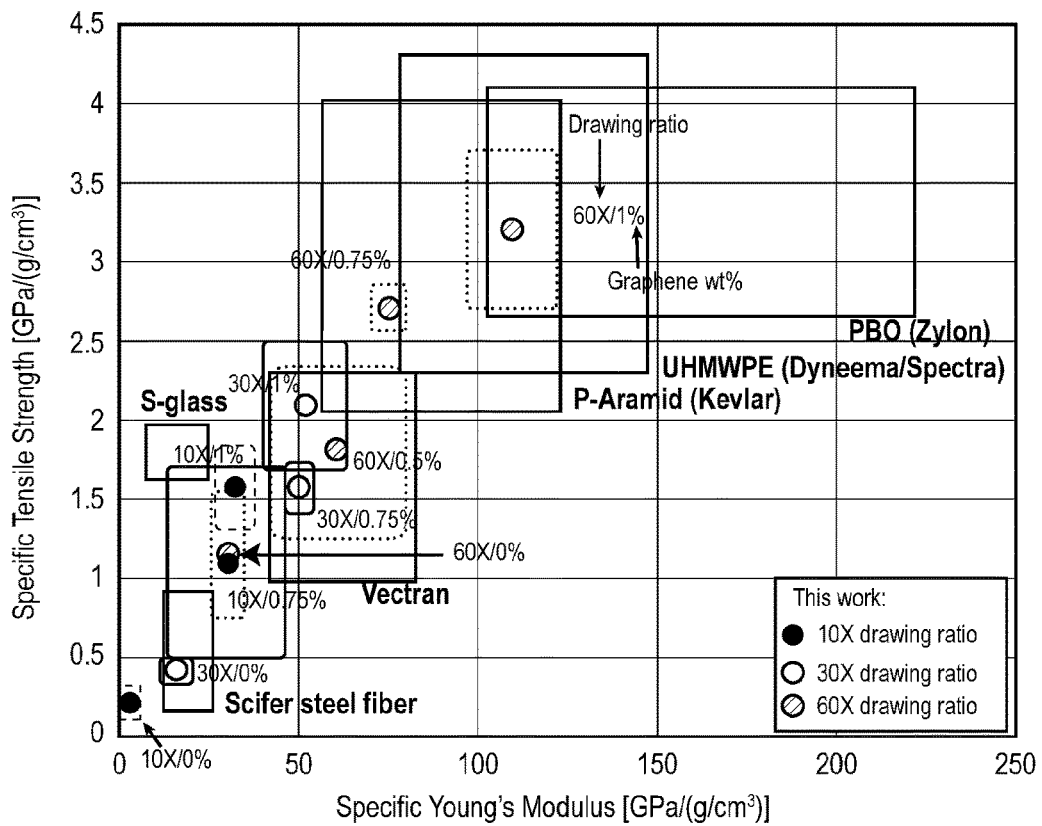
FIG. 1A charts specific tensile strength and specific Young's modulus for the present nano-composite films as compared to various commercial high strength fiber materials.
Figure 1A:
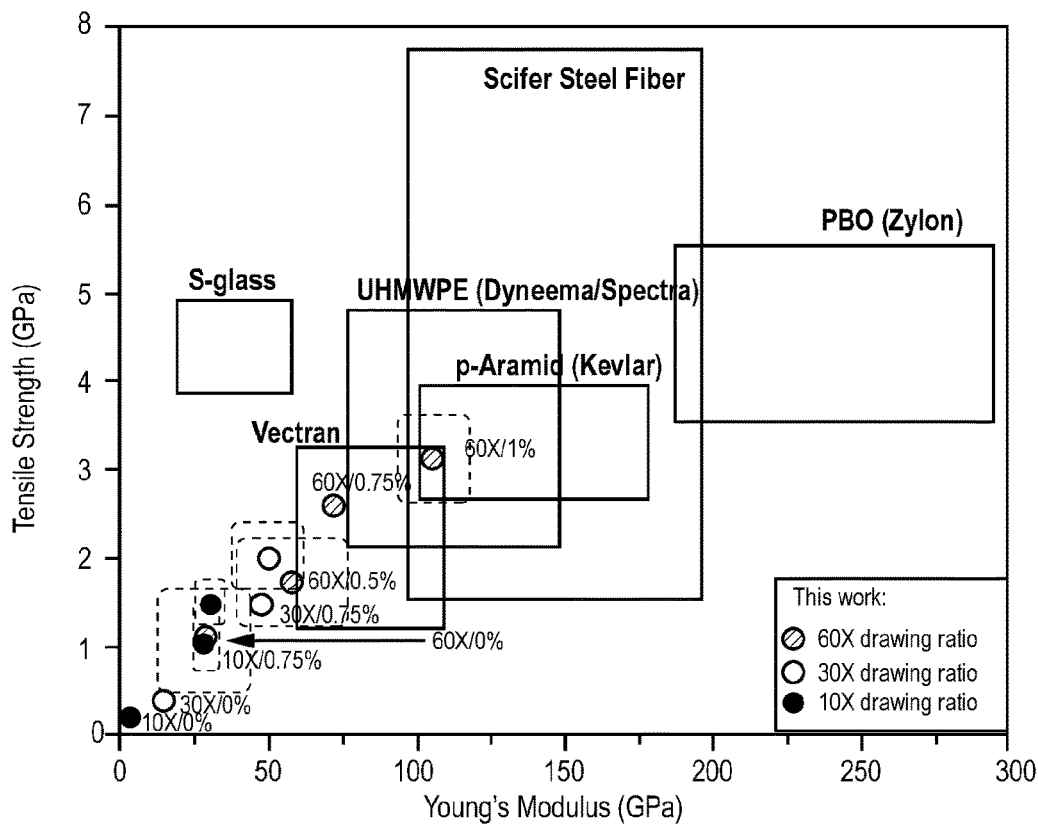

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising," which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

Unless otherwise stated, all percentages described herein are by weight.

In some embodiments, the films and compositions described herein may be free or substantially free from any specific components not mentioned within this specification. By 'substantially free of' it is meant that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

While advances have been made in development of composite fibers that can include high or even ultra-high tensile strength and elastic modulus, there have not been similar advances to date in development of composite films that might provide comparable properties. For example, S. Ruan, P. Gao, T. X. Yu, *Polymer* 2006, 47, 1604 reported the development of composite fibers including carbon nanotubes (CNT) with a fiber strength up to ~4.2 GPa/g/cm$^3$ and an elastic modulus of up to 137 GPa/g/cm$^3$. Graphene has similar mechanical properties as CNT, although reported graphene composites have not yet realized a similar level of enhancement in mechanical properties as CNT composites. The present disclosure describes polymer composite films and methods for their manufacture which include the highest reported specific tensile strengths and stiffness values, to date.

The present invention is directed to nano-composite films and methods for their manufacture, which can provide ultra-high specific tensile strength and/or specific elastic modulus. The films include a polymer matrix (e.g., a polyolefin such as polyethylene, polypropylene, or the like) and a graphene or other filler capable of exfoliation (e.g., TrGO, hexagonal boron nitride, or the like) dispersed within the polymer matrix. The nano-composite films can provide a specific tensile strength greater than 1 GPa/g/cm$^3$ (or at least 1.2 GPa/g/cm$^3$) a specific Young's modulus greater than 100 GPa/g/cm$^3$, or both. Such specific tensile strength and specific Young's modulus (i.e., stiffness) values are sometimes also referred to as a strength to weight ratio, or a stiffness to weight ratio, respectively, as they quantify the strength (or stiffness) divided by the density of the material. The relatively low density of such polymeric nano-composite film materials, coupled with high strength and stiffness, result in very high strength to weight, and stiffness to weight, ratios.

The method of manufacture may include (i) combining graphene powder or other filler and a polymer matrix powder in a solvent to form a solution, (ii) high-shear extruding the solution to result in disentanglement of polymer chains of the polymer and exfoliation of the graphene or other filler, (iii) freezing and drying the extruded solution to form a solid film, and then (iv) drawing the film to further increase filler exfoliation, as well as increase crystallinity, resulting in the nano-composite film with ultra-high specific tensile strength and/or specific stiffness.

III. Exemplary Nano-Composites and Methods of Manufacture

The present nano-composite films include a graphene or other filler capable of exfoliation provided within a polymer matrix. While the working examples included herein use polyethylene, it will be appreciated that other polymer matrix materials may also benefit from graphene or other filler reinforcement. For example, polypropylene and various other polyolefins, as well as other polymeric materials (e.g., PVC) could be used for the polymer matrix, and would likely similarly benefit.

Graphene is an exemplary reinforcing filler material. The graphene may be initially provided in powder form. The particles may be flake shaped, with a length and/or width significantly greater than the particle thickness. For example, such length and/or width may be at least 2×, at least 5×, or at least 10× relative to the particle thickness. The graphene material employed may not necessarily be a single atom thick graphene sheet, but may be configured as some number of "stacks" of such atomic layers. Because graphene stacks or "clusters" can be exfoliated through high shear extrusion, the mixing/sonication process, through drawing, or through other processes that may serve to separate adjacent planar sheets from one another, the starting graphene material may have an initial thickness that is greater than that observed in the finished nano-composite film, after significant exfoliation has occurred. While largely described in the context of using a graphene filler, it will be appreciated that there are other filler materials that exhibit similar layered sheet structures, which can be exfoliated from one another, so as to provide similar reinforcement. An example of such includes, but is not limited to hexagonal boron nitride.

Although TrGO may represent a suitable exemplary graphene material, various forms of graphene may be employed. Typical available graphene materials often include some degree of oxygen containing functional groups therein, as described in U.S. Publication No. 2017/0021387, incorporated herein by reference in its entirety. In an embodiment, the employed graphene has been treated to reduce the incidence of such oxygen containing groups (or other impurities therein). Thermal reduction of the oxygen content is one suitable example, such that thermally reduced graphene oxide (TrGO) is an example of a suitable graphene material. As another non-limiting example, the graphene material can include chemically reduced graphene oxide or functionalized graphene oxide (e.g., functionalized reduced graphene oxide). It should be appreciated that the presence of oxygen or other impurities (elements other than carbon and hydrogen) in the graphene material may be reduced to any desired degree. U.S. Publication No. 2017/0021387 describes methods for such reduction, and exemplary reduction levels. Various other methods and reduction levels will be apparent to those of skill in the art. Where a functionalized graphene oxide is used, the introduced functional groups may increase polymer graphene bonding to further enhance the mechanical properties.

It should also be appreciated that in some embodiments, the graphene powder can be supplemented or substituted, in whole or in part, with other layered materials. For example, the graphene powder can be substituted with hexagonal boron nitride (h-BN) powder—another layered material with high strength. In addition to mechanically reinforcing the composite material, the inclusion of h-BN powder could additionally provide electrical insulation to the composite material, among other benefits.

The amount of the graphene or other filler in the composite film may be any desired amount, although relatively low fractions are beneficial in the production process, as they make it easier to maintain a relatively lower viscosity in the solution, which is easier to process. Thus, in at least some examples, the amount of the filler may be no more than 10%, no more than 5%, no more than 3%, no more than 2%, no more than 1.5%, or no more than 1% (e.g., from 0.1% to 1%), by weight of the composite.

Figure 5A:
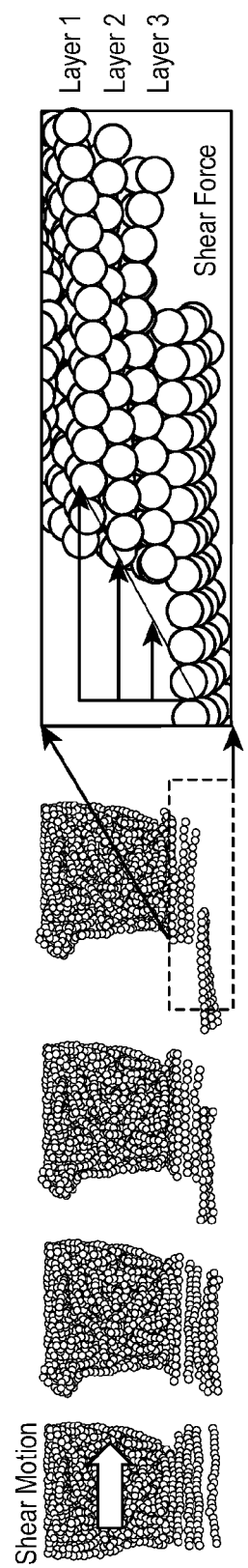
FIG. 5A schematically shows an MD simulation of a PE/multi-layer graphene junction, in which the bottom graphene layer is fixed and PE is sheared using steered MD. The Figure shows the relative displacement increasing for the graphene layers, indicating that the shearing PE exfoliates the graphene stack.
Figure 5B:
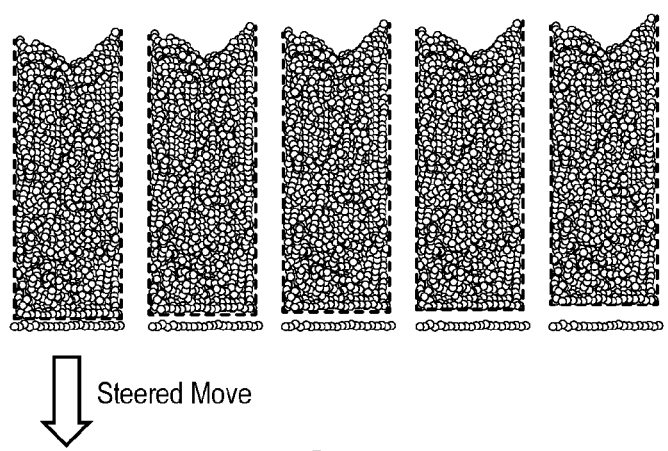
FIG. 5B schematically shows an MD simulation similar to that of FIG. 5A, but where a graphene layer is pulled away from the contacting PE junction, where the entire PE portion is fixed.
Figure 5C:
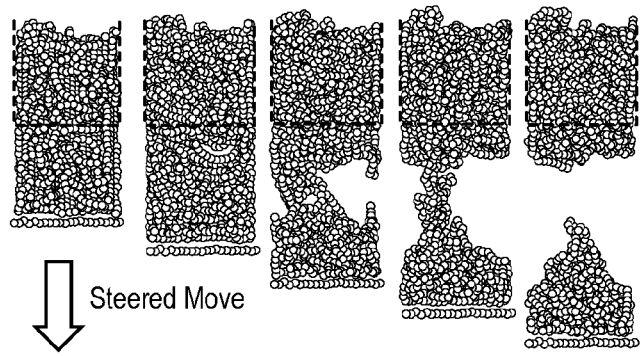
FIG. 5C schematically shows an MD simulation similar to that of FIG. 5B, but where only the top half of the PE portion is fixed.
Figure 5E:
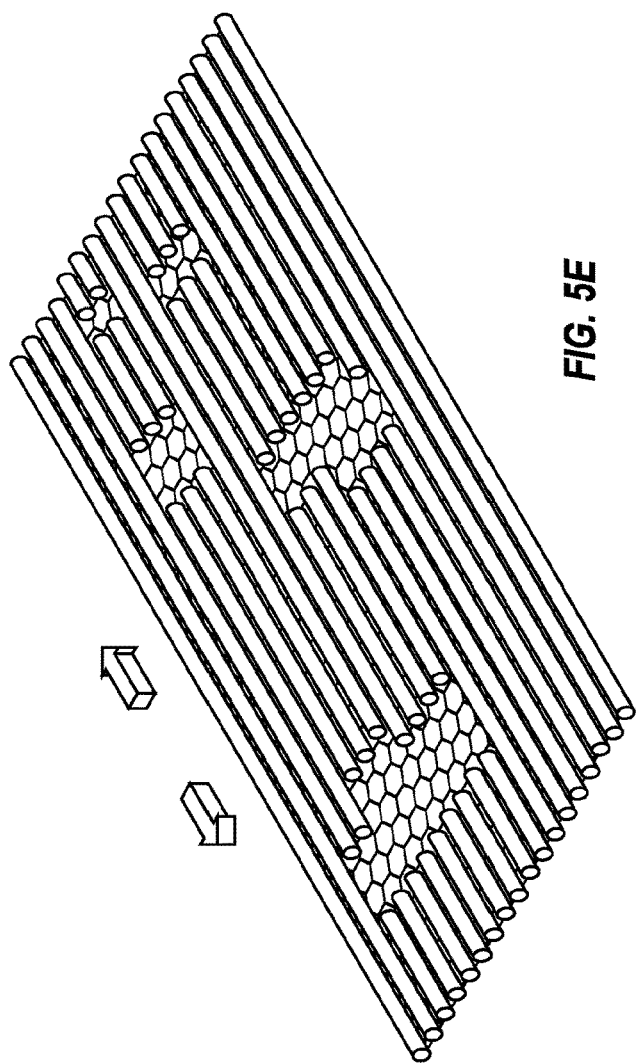
FIG. 5E schematically shows exfoliated graphene overlapping with many aligned polymer chains.

The filler particles may have a maximum dimension that is no more than 100 μm, no more than 50 μm, no more than 30 μm, no more than 25 μm, no more than 20 μm, no more than 15 μm, or no more than 10 μm. The size of the filler can be larger than the inter-molecular separation of polymer chains, which ranges from 0.4-0.7 nanometer. For example, the filler size may be at least 10× larger than the inter-molecular separation of the polymer chains (i.e., intermolecular lattice constants). This can allow many polymer chains to contact the same graphene flake and transfer the load to it. Such characteristics may aid in ensuring that there is good overlap from a given "flake" of graphene across several polymer chains, as depicted in FIG. 5E. Any of the characteristics described herein relative to a graphene filler may similarly apply to an alternative filler, e.g., h-BN, or the like.

The particular polymer selected for use as the polymer matrix may have a chain length that is larger than the graphene or other filler particles. For example, an ultra-high molecular weight polymer (e.g., UHMWPE) may be selected, e.g., having a molecular weight greater than 1 million, greater than 2 million greater than 3 million, or greater than 5 million (e.g., from 3 million to 10 million, or from 3.5 million to 7.5 million). In an exemplary case, the UHMWPE has a molecular weight of about 5.5 million amu.

For example, the polymer chain length may be at least 25 μm, at least 30 μm, at least 35 μm, at least 40 μm, from about 25 μm to 100 μm, or about 50 μm.

Figure 2:
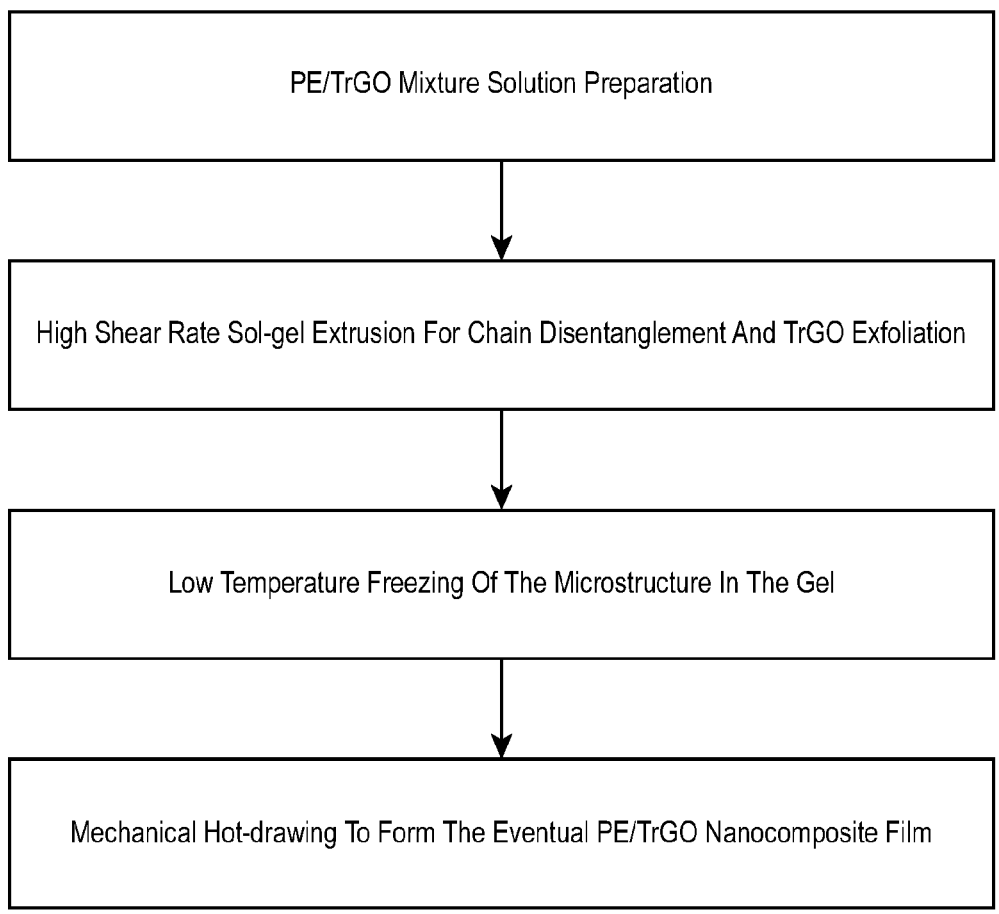
FIG. 2 is a flowchart describing an exemplary film fabrication process.

The general process of fabrication as shown in FIG. 2 generally includes combining graphene powder or another filler (e.g., in powdered form) with a polymer matrix powder in a suitable solvent to form a solution or suspension, extruding the solution or suspension in a manner that results in disentanglement of polymer chains and exfoliation of the filler, freezing and drying of the extrudate to form a solid film, and drawing of the film to form the nano-composite film. The term "solution" is used herein for simplicity when referring to the initially prepared solution or suspension of starting materials. The term solution is meant to encompass a suspension, e.g., even where the components may not technically be dissolved in (but merely suspended in) the solvent.

Various suitable solvents that may be used for combining and homogenously mixing the graphene powder or other filler with the polymer powder will be apparent to those of skill in the art. Exemplary solvents include various organic solvents, particularly cyclic organic solvents, such as cycloalkanes. Decalin (a bicyclic cycloalkane) is a particularly suitable example. Various aromatic hydrocarbons may also be suitable for use, such as benzene, or derivatives thereof (e.g., structures including an aromatic ring). Acetone is another example of an exemplary organic solvent.

Following preparation of the solution including the graphene powder or other filler, the polymer powder, and solvent, the solution may be extruded (e.g., at high shear). The extruded product may be solidified (e.g., by freezing) with liquid $N_2$ or the like and dried. This results in formation of a solid film of the composite, which can finally be drawn, at a desired drawing ratio. Sonication (or other mixing) during solution preparation, extrusion, and drawing all serve to further exfoliate the filler, which serves to increase the tensile strength and stiffness of the resulting composite.

The composites may have specific tensile strength values (i.e., strength to weight ratios) that are very high. The specific tensile strength may be at least 1 GPa/g/cm$^3$, at least 1.1 GPa/g/cm$^3$, at least 1.2 GPa/g/cm$^3$, at least 1.3 GPa/g/cm$^3$, at least 1.4 GPa/g/cm$^3$, at least 1.5 GPa/g/cm$^3$, at least 2 GPa/g/cm$^3$, at least 2.5 GPa/g/cm$^3$, at least 3 GPa/g/cm$^3$, at least 3.2 GPa/g/cm$^3$, at least 3.7 GPa/g/cm$^3$, from 1 GPa/g/cm$^3$ to 5 GPa/g/cm$^3$, from 1.5 GPa/g/cm$^3$ to 4 GPa/g/cm$^3$, or from 1.5 GPa/g/cm$^3$ to 3.5 GPa/g/cm$^3$. Those of skill in the art will appreciate that absolute tensile strength values may be easily derived from specific tensile strength values.

The composites may also have specific Young's modulus values that are very high. The specific Young's modulus (i.e., specific stiffness) may be at least 50 GPa/g/cm$^3$, at least 55 GPa/g/cm$^3$, at least 60 GPa/g/cm$^3$, at least 65 GPa/g/cm$^3$, at least 70 GPa/g/cm$^3$, at least 75 GPa/g/cm$^3$, at least 80 GPa/g/cm$^3$, at least 85 GPa/g/cm$^3$, at least 90 GPa/g/cm$^3$, at least 95 GPa/g/cm$^3$, at least 100 GPa/g/cm$^3$, at least 125 GPa/g/cm$^3$, at least 140 GPa/g/cm$^3$, at least 150 GPa/g/cm$^3$, from 50 GPa/g/cm$^3$ to 300 GPa/g/cm$^3$, from 100 GPa/g/cm$^3$ to 300 GPa/g/cm$^3$, or from 150 GPa/g/cm$^3$ to 250 GPa/g/cm$^3$. Those of skill in the art will appreciate that absolute Young's modulus values may be easily derived from specific Young's modulus values.

The composite may exhibit high crystallinity, e.g., at least 20%, at least 30%, at least 50%, at least 60%, at least 80%, at least 90%, or at least 95% (e.g., 96% to 99%).

Although the composite films can provide very high tensile strength and stiffness, they can still be formed into a flexible structure, e.g., as a thin film. For example, such a thin film may be wrapped around or provided over a flexible or other substrate. Although any thickness may be provided, film thicknesses may typically be less than 1000 microns, less than 500 microns, less than 300 microns, less than 200 microns, less than 100 microns (e.g., from 10 to 100 microns).

In some embodiments, the drawing ratio and/or filler loading of the composites can be further increased to further improve mechanical properties of the composite, such as the specific stiffness and/or specific tensile strength. For example, drawings ratios greater than 60× or 70× (e.g., 75× to 200×, 100× to 150×, or the like) may serve to further increase such properties. Filler loadings greater than 1% (e.g., 2%, 3%, 5%, 10%, or even greater) may also serve to further increase such mechanical properties.

III. Working Examples

FIG. 2 schematically illustrates steps as described above, that were used to produce various nano-composite films of polyethylene and thermally reduced graphene oxide (TrGO) filler. These produced composite films were tested in various ways, to characterize their mechanical and other properties. As shown in FIGS. 1A, 1AA, 1B, and 1BB, in the present working examples, polyethylene (PE) films composited with TrGO fabricated from a roll-to-roll drawing process are demonstrated to have superior mechanical properties (e.g., 3.2±0.5 GPa/g/cm$^3$) in specific tensile strength and in specific modulus (e.g., 109.3±12.7 GPa/g/cm$^3$). In absolute terms, this sample had a tensile strength of 3.1±0.5 and an absolute stiffness of 106±12.3 GPa. These values represent some of the highest, and perhaps the very highest achieved to date in polymer/graphene composites and are comparable to some of the best commercial polymer fibers and polymer/CNT composites, as shown for comparison in FIGS. 1A, 1AA, 1B, and 1BB. The present results also indicate that the weight fraction of the TrGO or other filler and the drawing ratio can significant impact the mechanical properties of the nano-composite films.

The employed TrGO flakes measured to be as thin as about 0.6 nm. To prepare the PE/TrGO mixture solution, UHMWPE powder (3-6 million g/mol) was added to decahydronaphthalene (decalin) solvent to form a dilute solution with 3% PE. Different amounts of TrGO powder was added to the PE solution to achieve the different weight fractions (0%, 0.5%, 0.75%, and 1%) in the final composite. To facilitate filler dispersion in the solution, ultrasonic stirring was performed for 30 minutes (e.g., 5 minutes to 2 hours). The solution was then heated to 150° C. in an oil bath (e.g., 100° C. to 200° C., or 105° C. to 175° C.) for 24 hours (e.g., 1 hour to 3 days, 5 hours to 2 days, or 10 hours to 30 hours). Antioxidant (e.g., 2,6-di-tert-butyl-4-methyl-phenol) was added at 0.5% (e.g., 0.01% to 5%) to prevent oxidation during dissolution. The mixture was magnetically stirred for 24 hours (e.g., 1 hour to 3 days, 5 hours to 2 days, or 10 hours to 30 hours) to ensure complete dissolution.

Figure 2A:
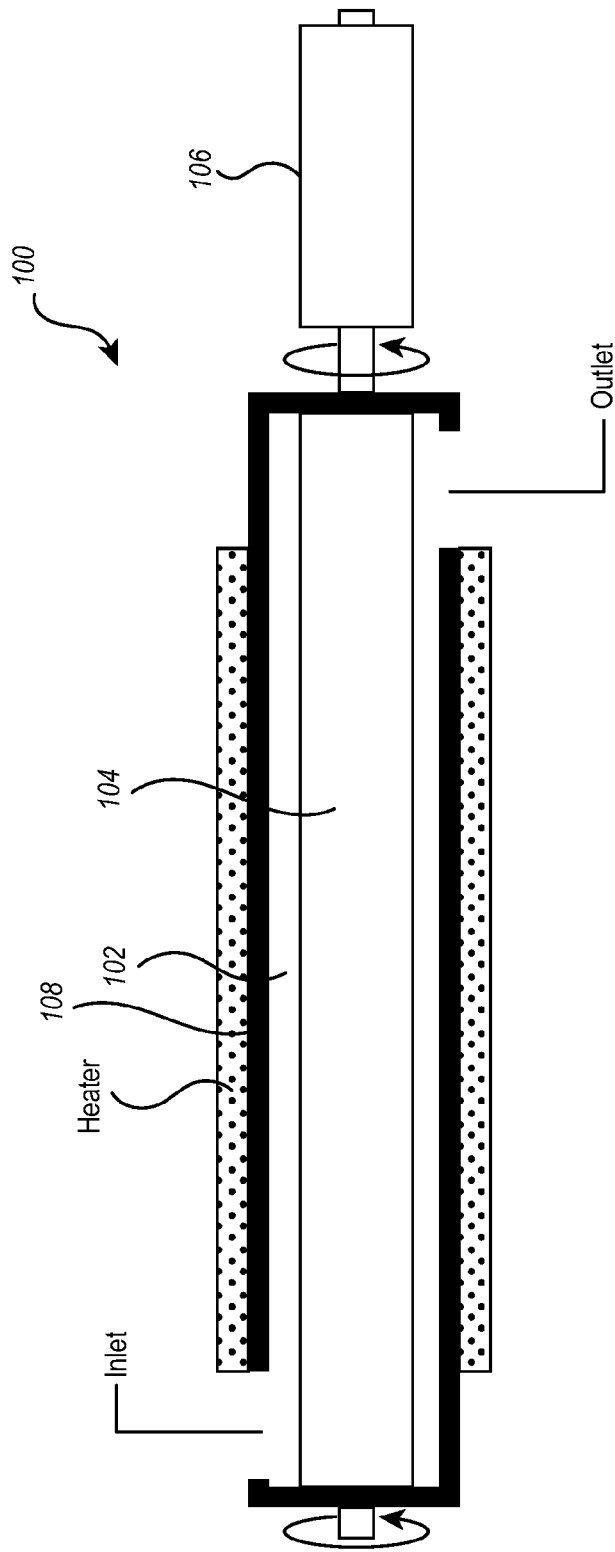
FIG. 2A is a schematic view of an exemplary extrusion machine for applying high shear to the solution.

As shown in FIG. 2A, the PE/TrGO solution was fed to an extrusion machine 100 where the flow channel was maintained at 120° C. (e.g., 80° C. to 200° C. or 100° C. to 150° C.). The solution was forced through the extrusion chamber 102 by pressurized air at a pressure of 140 kPa. A solid cylinder 104 inside the cylindrical extrusion chamber was driven by a DC motor 106 at 1900 RPM (e.g., at least 1000 RPM, 1500 RPM to 5000 RPM, etc.) to generate a Couette flow, initiating a uniform high shear rate to the PE/TrGO solution when it passes through the 1 mm gap between the two cylindrical surfaces of the rotated cylinder 104 and the illustrated outer cylinder 108. It will be appreciated that a wide variety of alternative extrusion devices and methods could be used, such that the schematic shown in FIG. 2A is merely illustrative. Extruded solution exited the chamber onto a $N_2$ cooled substrate, freezing the internal microstructure. The solvent was evaporated at ambient conditions over 24 hr, forming a stable film. The dried film was fed into a mechanical drawing system, heated to 85° C. (e.g., 40° C. to 200°, 50° to 150° or 60° C. to 100° C.) to soften the film for drawing. Different drawing ratios (10×, 30×, and 60×) were applied.

TEM imaging was achieved using FEI Tecnai F30 equipment. SEM was achieved using EVO 50 LEO and Carl Zeiss equipment. WAXD was performed at room temperature using Cu $K_\alpha$ radiation ($\lambda$=1.5418 Å) over 9-60° two-theta using a step size of 12° and a step time of 0.5 s. Micro-Raman spectroscopy was achieved using NRS-5000 Jasco equipment. Optical microscope observation was achieved with a Nikon Eclipse Ti-E inverted optical microscope. Tensile tests were conducted under ambient conditions using an electromechanical load frame (Bose Electro Force 3300). The drawn film was split into narrow ribbons which were mounted with a 14 mm gauge length for testing using methods described in Viney, C.; Llorca, J.; Elices, M.; Pe, J. Silkworm Silk as an Engineering Material. *J. Appl. Polym. Sci.* 1998, 70, 2439-2447. Polymer film ribbons are loaded at a crosshead speed of 0.1 mm/s until failure. Young's modulus and the ultimate tensile strength are calculated from the measured force-displacement data, gauge length, and cross-sectional area of tested ribbons. Measurements are reported as the mean (±standard deviation) of replicates (n=3-10 specimens/group). Load and displacement data were collected at 10 Hz using a 5 lb load cell (MBP-5, Interface) and linear variable displacement transducer (LVDT), respectively. Apparent stress and strain values were calculated based upon the dimensions of the rehydrated scaffolds measured prior to loading using digital calipers (±0.01 mm). The zero strain point was set at first region of the stress-strain curve exhibiting a slope of 5 kPa or higher within a 2% strain range. The scaffold compressive modulus was measured as the maximum slope of the stress-strain curve over a 5% strain range within 0-20% strain.

From experimental characterizations (e.g., wide-angle X-ray diffraction (WAXD), Raman microscopy, scanning electron microscopy (SEM), transmission electron microscopy (TEM)), as well as molecular dynamic (MD) simulations, the presently achieved superior mechanical properties are believed to be attributable to (1) PE molecular chains becoming highly aligned after drawing, and thus the axial load is largely carried by the strong covalent bonds along the backbone, (2) the TrGO dispersed in the polymer matrix is exfoliated in the drawing process, which increases the specific surface area for reinforcement interaction between the polymer matrix and the graphene filler, and (3) PE-TrGO interactions are stronger than the PE-PE inter-molecular van der Waals (vdW) interaction, which thus help load transfer from PE to TrGO and thus leverage the ultrahigh mechanical properties of TrGO.

Polymers find a wide range of applications due to their lightweight, low-cost, easy processability, nontoxicity, biocompatibility, and outstanding chemical resistance. However, since polymers in their bulk amorphous phase have entangled molecular chains, voids and other defects, they usually have relatively low stiffness and strength. Research has shown that aligned polymer fibers can have much greater mechanical properties, where the load is largely carried by the strong covalent bonds along the polymer chains. Recent studies on PE nanofibers (70-260 nm in diameter) fabricated using multi-stage ultra-drawing have shown unprecedented tensile strength up to 11.4 GPa (per g/cm$^3$) and Young's modulus of 312 GPa (per g/cm$^3$) thanks to close to 100% crystallinity in such fibers. The fabrication of such nanofibers, however, is not at all trivial, and the small dimensions demonstrated to date can impose challenges for their application.

Polymer films, which may be produced more massively than fibers, are promising to expand the application of polymers or making their existing applications more convenient and cost-effective. In order to improve the mechanical performance of neat polymer film, strategies like zone annealing and melt/drawing have been implemented. However, the fabrication processes for such materials are not well adapted to continuous production (i.e., they are batch processes) and drawing ratios cannot be extended to the same level as polymer fibers. The crystallinity of such produced films is usually <40% and the mechanical properties are much lower than most high strength fibers. As such, they do not present a serious or practical alternative.

Figure 1B:
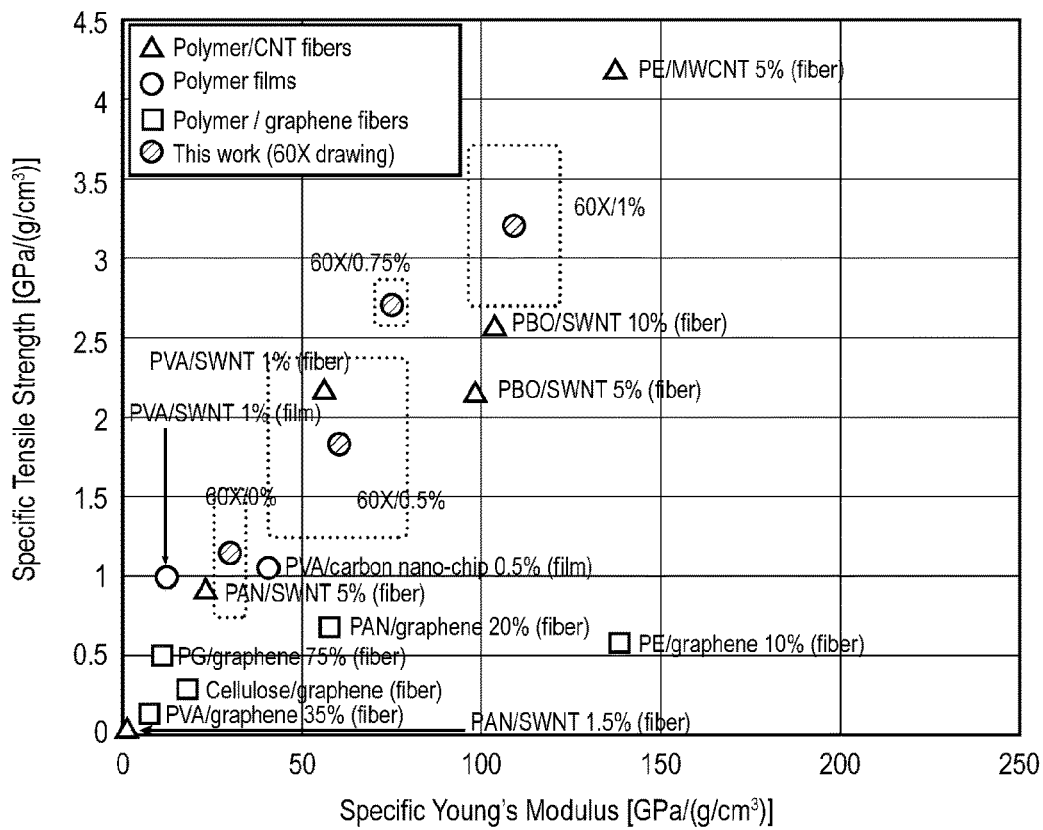
FIG. 1B charts specific tensile strength and specific Young's modulus for the present nano-composite films as compared to different polymer/carbon nano-material composites (e.g., single wall and multi-walled carbon nanotube composites).
Figure 1B:
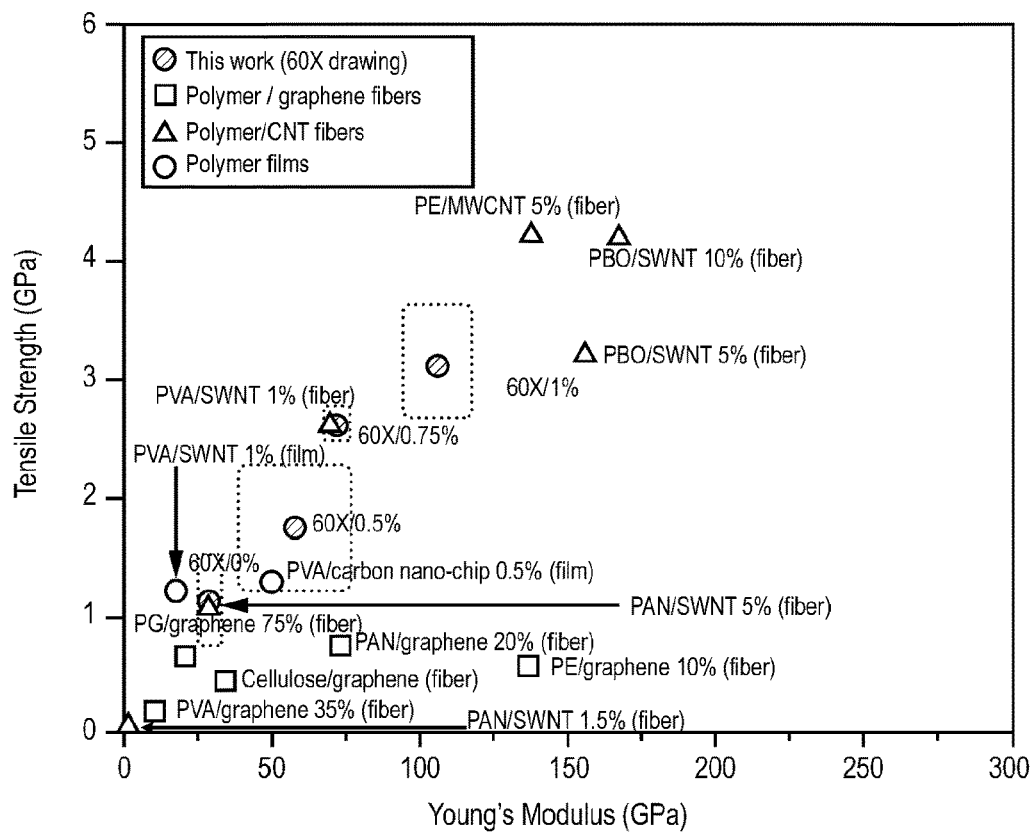

The addition of reinforcing nano-fillers can significantly enhance mechanical properties of a composite based on a polymer matrix. CNTs have been the main focus for the past three decades as filler materials for polymer composites. Polymer/CNT composite fibers (and even some films) indeed exhibit high strengths (~1.0 GPa in specific tensile strength, as shown in FIG. 1B), although the fiber structures exhibit the already described disadvantages, and the composite films in the literature exhibit very low modulus values, are difficult to manufacture, or exhibit other problems. For example, FIG. 1B shows a PVA/SWNT film with specific tensile strength of 1 GPa/g/cm$^3$ (modulus of only 1.6 GPa/g/cm$^3$) and a PVA/carbon nano-chip film with specific strength of 1.1 GPa/g/cm$^3$ (modulus of only 48 GPa/g/cm$^3$). Graphene and derivatives thereof (e.g., reduced graphene oxide and functionalized graphene oxide) are of significant interest as composite fillers due to their similar native mechanical properties relative to CNT, but also advantageously exhibit an ability to be exfoliated. Such combinations would also provide for better mass producability. As such, in at least some embodiments, the present composites may be free of or substantially free of CNTs. Up to now, polymer/graphene composite fibers have not lived up to early high expectations, exhibiting mechanical properties that are much inferior to polymer/CNT composites, as shown in FIG. 1B. No high strength polymer/graphene composite films as disclosed herein have been reported to the knowledge of the present inventors.

Here, we integrate a nano-compositing strategy into an extrusion-drawing process to fabricate PE/TrGO composite films and demonstrate superior mechanical properties. Briefly, as shown in FIG. 2, TrGO powder was added to a PE/decalin solution, which was then extruded using a high shear rate to disentangle the polymer chains as well as exfoliate the TrGO. By way of example, the high shear may be provided at rotor speeds of at least 1000 RPM, at least 1500 RPM, at least 1750 RPM, such as 1500 RPM to 5000 RPM, or 1750 RPM to 3000 RPM. The extruded composite solution was then frozen at low temperature (e.g., using liquid N$_2$) and dried to obtain a solid film. This film was then drawn to form the final composite films. The high internal shear stress applied in the drawing process helps to further exfoliate the TrGO. Different drawing ratios (10×, 30×, and 60×) and different TrGO weight fractions (0.5%, 0.75% and 1%) were prepared and characterized. Higher concentrations of graphene or other filler could be used, where the resulting increase in viscosity of the solution being extruded is adjusted for. The samples were characterized using optical microscope, WAXD, Raman spectroscopy, TEM, and SEM. Mechanical tests were performed on the prepared films to measure tensile strength and Young's modulus.

Strain-stress curves for the prepared PE/TrGO composite films with 60× drawing ratios at different filler concentrations are shown in FIG. 3A. It is readily apparent that as the TrGO content increases, both the tensile strength and the Young's modulus increase. Since the graphene has higher intrinsic strength and stiffness than the PE matrix, more graphene content enhances the mechanical properties of the composite. Another noteworthy observation is that although the tested graphene filler fractions are very low (e.g., no more than 1%), the mechanical property enhancement is significant, even surprising. For example, with only 1% graphene, the specific tensile strength of the PE film increased from 1.1 GPa to 3.1 GPa—a 182% improvement. Stiffness (i.e., Young's modulus) increased by more than a factor of 5. Such significant improvements in mechanical properties with low filler fractions are believed to be due to substantially homogenous dispersion of the filler and the very high specific surface area of the filler as a result of exfoliation, which helps to distribute load from the relatively weaker polymer matrix to the relatively stronger filler.

The level of enhancement in mechanical properties is even more significant than those achieved in high strength polymer/CNT composite fibers. Without wishing to be bound by theory, it is the inventors' belief that this may be attributed to graphene's larger surface area per unit of mass, given that in its fully exfoliated condition, it is substantially a 2D sheet, rather than a 3D tube or other 3D structure. In general, the specific surface area of the graphene fillers is further increased as they more nearly approach full exfoliation. In the present film preparation process, there are three steps that progressively increase exfoliation of the graphene relative to the beginning graphene powder. These include sonication of the polymer/graphene solution, high shear rate extrusion, and mechanical drawing. Drawing can be very effective in exfoliating layered fillers embedded in a polymer matrix. The final exfoliation achieved during drawing is further aided by earlier exfoliation achieved during preparation of the initial solution (where ultrasonic mixing ("sonication") may be applied, followed by extrusion). When the composite films are drawn, the different layers in an aggregated graphene cluster move with the adjacent polymer chains, expanding the spatial extension of the cluster. This process increases the specific surface area of the fillers so that there is more contact with the surrounding polymer chains. The effect of this drawing or otherwise induced exfoliation can also be seen in FIGS. 3C-3D, which FIGS. show that mechanical property enhancement for a given filler fraction further increases as the drawing ratio increases. Such characteristics may also occur with other fillers, e.g., such as h-BN.

Figure 4G:
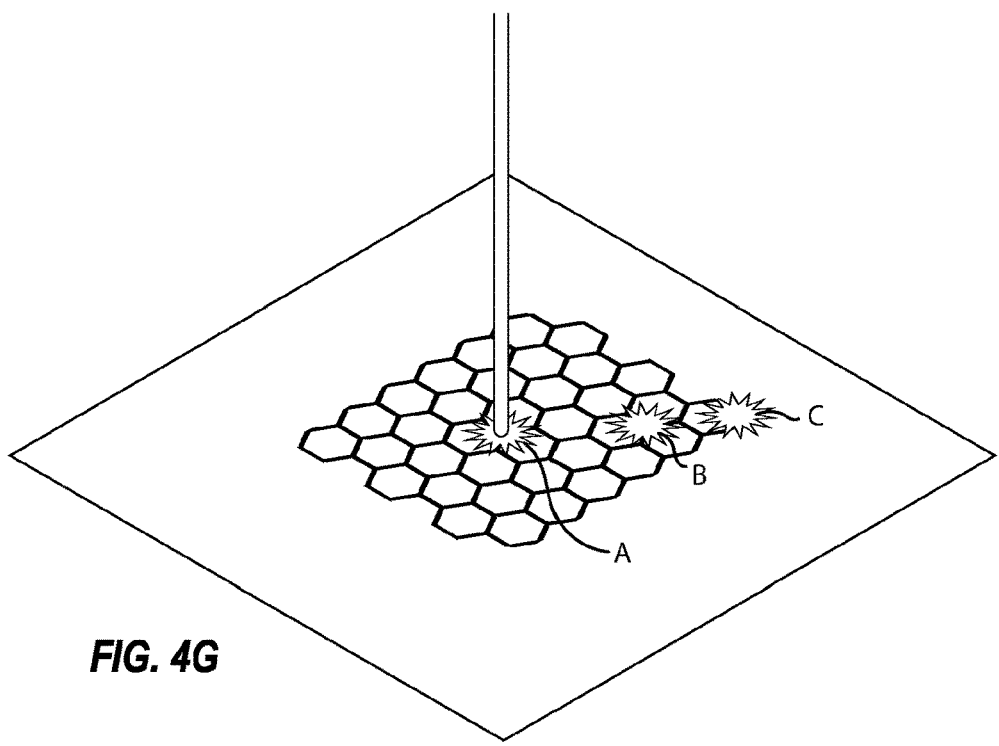
FIG. 4G is a schematic illustration showing general locations for the Raman spectroscopy measurements that are shown in FIG. 4H.
Figure 4H:
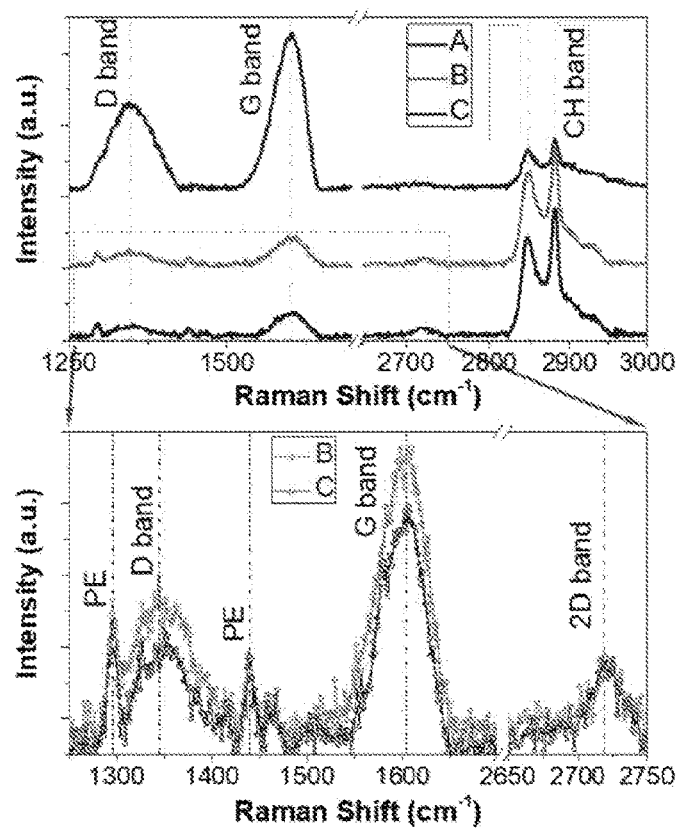
FIG. 4H shows Raman spectroscopy plots for a graphene cluster in an examined composite.

To characterize the exfoliation effect, SEM, TEM and Raman spectroscopy measurements were performed on prepared samples at different drawing ratios. FIGS. 4A-4C show SEM images at locations in the composite where TrGO clusters are visually obvious. As the drawing ratio increases, the TrGO clusters become more transparent as a result of their progressively reduced thickness, as they become further exfoliated. This increased transparency is also apparent in the two insets in FIG. 3D. TEM images (FIGS. 4D-4F) similarly show filler flakes exfoliating and aligning along the drawing direction, so as to exhibit an increased aspect ratio. Micro-Raman spectroscopy was also used to probe the graphene peaks around a visually less transparent graphene spot in a film with 30× drawing ratio and 0.75% TrGO fraction. The Raman laser (~1 µm in diameter) moves from approximately the center of the "dark" spot towards the edge of the spot, a total distance of 10 µm, as shown in FIG. 4G. As the laser moves along the drawing direction (from A to B to C), the intensity of the G peak ($I_G$) decreases gradually while the intensity of the 2D peak ($I_{2D}$) increases (FIG. 4H). The ratio of $I_{2D}/I_G$ strongly correlates to the number of graphene layers in the filler flake or particle. Moreover according to the comparison result of $I_{2D}/I_G$ at points A, B and C (shown top to bottom in the top chart of FIG. 4H), we can conclude that the number of layers in graphene "stacks" of the flake or particle fillers decreases along the testing track, from A to B, to C. This is believed to be attributable to drawing-induced exfoliation.

To further confirm that drawing results in graphene exfoliation, MD simulations were also performed. The simulation domain includes a polymer block in contact with a stack of a few graphene layers where the bottom layer is fixed, as shown in FIG. 5A. The polymer is sheared in parallel to the graphene layers. Because periodic boundary conditions are applied, one carbon atom is tracked in the top graphene layer and its displacement is measured from the initial position. FIG. 5A shows the top graphene layer displacement relative to the bottom layers as the polymer moves, meaning that shearing polymer can drag the contacting graphene layer, causing movement thereof. This means that the interaction between the polymer and graphene is stronger than that between adjacent graphene layers, which is the atomic level mechanism believed to result in drawing-induced exfoliation.

The theoretical strength and modulus of a perfect crystalline PE matrix, with a strength >11 GPa and modulus >370 GPa, is still much larger than those achieved here for the tested PE/TrGO composite films, because mechanical behavior of the present films is still limited by the inter-chain vdW interactions (e.g., aligned chains can still slide relative one another when subject to strain). In this scenario, in order for the TrGO filler to enhance the already high mechanical property of PE films, it is important that interaction between PE molecules and graphene be stronger than that among the PE molecules themselves. The real time forces are calculated from steered MD simulations where the polymer is pulled away from the graphene layers. In one case, all polymer molecules are fixed, and in another case, half of the polymer block is fixed (FIGS. 5B and 5C, respectively). The fixed portions in FIGS. 5B-5C are shown by the dashed block. In the second case (FIG. 5C), when the graphene is pulled away from the polymer, the breakage in the structure happens within the polymer block, with a few polymer chains adhering to the graphene surface.

Figure 5D:
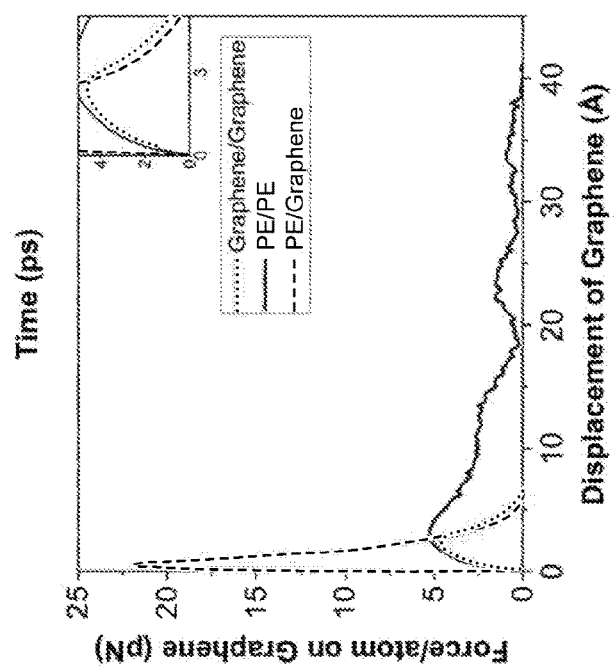
FIG. 5D shows force as a function of displacement of the tracked graphene atom for the scenarios of FIG. 5B and 5C.

As seen from FIG. 5D, the force needed to break the polymer away from the graphene is much larger than that needed to break the polymer apart from itself. These results suggest that the interaction between the polymer and the contacting graphene layer is very strong and load transfer from the polymer matrix to the graphene filler is efficient and contributes to the measured increase in mechanical properties. This also suggests that some exfoliation of graphene clusters or stacks can occur before chain disentanglement. The measured TrGO size for the flakes or other particles used to prepare the composites was about 10 µm, which is on the same order of magnitude as the length of a fully extended ultrahigh molecular weight PE chain (e.g., ~50 µm). From the SEM images of FIGS. 4A-4C (see white arrows), the lateral sizes of the exfoliated graphene filler is estimated to be from 1 to 7 µm, or 1 to 5 µm, which is less than the starting size, but is still far larger than the applicable inter-molecular lattice constants for the polymer chain (~0.74 and 0.49 nm). This allows the dispersed TrGO filler particles, especially when exfoliated, to have significant spatial overlap with a large number of PE chains, as depicted in FIG. 5E. This not only replaces the weaker vdW interchain interaction with relatively stronger graphene-PE interactions, but also helps maximize the benefit of the strong graphene filler as the load can be efficiently transferred from the polymer matrix to the graphene filler. In addition, the extremely small thickness of the graphene "flake" compared to the lateral dimensions of the graphene filler can easily lead to a wrinkled topology which improves the mechanical interlocking of the filler with PE chains and thus better adhesion at the PE-TrGO interface.

Another important observation from the mechanical test is the progressively increasing tensile strength and stiffness as the films are drawn to higher drawing ratios. This feature is readily apparent from FIGS. 3C-3D. This is directly related to the crystallinity of the drawn films, as higher crystallinity can provide greater mechanical properties. This is evidenced by the WAXD measurements of FIG. 6A, where the signature PE peaks (2Φ=21.5° and 24°), corresponding to the ("110") and ("200") Bragg reflections of PE crystalline structure, are enhanced significantly as the drawing ratio increases. The crystallinity of the neat films is 4% (0× draw), 30% (10× draw), 67% (30× draw) and 97% (60× draw), respectively, calculated as the percentage of crystalline PE scattering peak intensity with respect to the total scattering intensity.

In particular, crystallinity is calculated as the percentage of crystalline PE scattering peak intensity with respect to the total scattering intensity using the formula below.

$$\%_{crystallinity} = 100\% \times \frac{\sum A_{Area\ crystalline\ peaks}}{\sum A_{Area\ crystalline\ peaks} + \sum A_{Area\ amorphous\ humps}}$$

WAXD spectra were refined using the Pawley fit method based on an orthorhombic crystal structure. Pawley fitting is chosen over Le-Bail fitting due to the non-overlapping nature of the observed peaks between 20°-25°, which correspond to the (110) and (200) planes in the orthorhombic PE crystalline structure. The data shows that as the drawing ratio increases, the film is transformed from amorphous to crystalline. The peaks of the as-extruded polymer film (i.e., 0× drawing ratio) are very weak, with a crystallinity (4%) that is even lower than that of the starting PE powder (40%), which has dispersed lamellar structures. This suggests that the high shear extrusion step serves to disentangle the PE chains. The disentanglement achieved in such high shear extrusion is an important prerequisite for the subsequent hot-drawing process, since without it the polymers cannot be drawn to higher draw ratios without fracture.

As shown in FIG. 6B, WAXD measurements were also performed on the PE/TrGO composite films with 0.75% graphene filler, at different drawing ratios. Similar to the neat films, both PE peaks (110 and 200) increase as drawing ratio increases. The total crystallinity is also increased compared to the neat films. Although normally TrGO would exhibit a peak around 24°, overlapping with the PE (200) peak, because the TrGO fraction is so small, its existence does not contribute significantly to the peak intensity, and is ignored.

Another noteworthy observation is relative to the ratios of the two peaks ($S_{200}/S_{110}$), which stay almost unchanged for the neat PE films when drawn but increase significantly when the PE/TrGO composite film is drawn. This information is presented below in Table 1.

TABLE 1

| Drawing Ratio | $S_{200}/S_{110}$ for Neat PE Film | $S_{200}/S_{110}$ for PE/TrGO Composite Film |
|---|---|---|
| 10× | 0.38 | 0.53 |
| 30× | 0.40 | 0.77 |
| 60× | 0.40 | 0.93 |

It is likely that the PE order in the (200) plane is related to the preferential crystallization orientation at the vicinity of the TrGO fillers. As drawing ratio increases, there are more TrGO surfaces that become available for such PE preferential crystallization, and thus the PE (200) peak intensity increases with increased drawing. This observation provides additional evidence for drawing-induced filler exfoliation, which provides increased specific surface area for PE crystallization.

In summary, Applicant has demonstrated very high mechanical properties in PE/TrGO nano-composite film fabricated using high shear rate extrusion and mechanical drawing. The highest tensile strength and Young's modulus achieved in the tested materials are 3.2±0.5 GPa/g/cm³ and 109.3±12.7 GPa/g/cm³, respectively, representing the highest values reported for any polymer/graphene composites. Such enhancement is due to the combination of drawing induced crystallization of the polymer matrix, and exfoliation of the graphene filler during the high shear rate extrusion, during mechanical drawing, and during initial preparation of the starting solution. Such exfoliation significantly increases the specific area of the graphene filler particles. In addition to the strong PE-graphene interaction and the excellent reinforcement of mechanical properties provided by graphene, loads placing the film under tension in the machine direction (i.e., parallel to the drawing direction) can be efficiently transferred from the matrix to the filler particles, taking full advantage of the strong filler characteristics. Such composite film fabrication methods may also be generalized to develop other high strength polymer composites.

FIGS. 7A-7C show optical microscope images of prepared composite films, shown at 0× draw (FIG. 7A), 20× draw (FIG. 7B), and 50× draw (FIG. 7C). In these images, the scale bar is 20 µm. The increase in crystallinity (i.e., ordered, linear alignment) is readily apparent therefrom.

Figure 10:
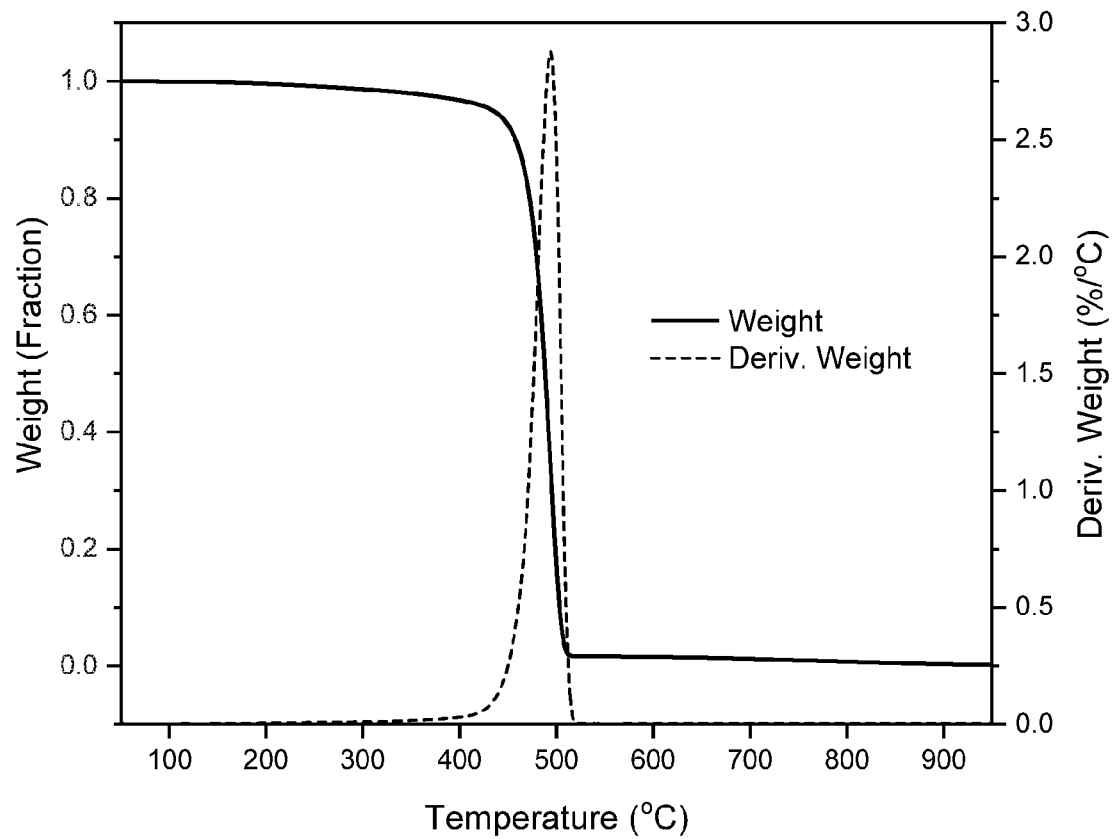
FIG. 10 charts temperature stability data for an exemplary composite film.

Additional testing, of thermal properties, was performed on composite films including 1.25% TrGO in a polyethylene matrix, at a 10× drawing ratio. Interestingly, it was found that the melting temperature (145.7° C.) was increased as a result of the presence of the filler material (e.g., the polyethylene alone had a melting temperature of 140.9° C.). Heat capacity of the composite film was 1700 J/kg.K (slightly increased as a result of filler addition). Density was 0.975 g/cm³. Thermal diffusivity of the composite film was 1.3× 10' m²/s and thermal conductivity was increased significantly (e.g., by an order of magnitude) to 2.15 W/(m.K). For example, thermal diffusivity and/or thermal conductivity may increase by at least 10%, at least 25%, at least 50%, at least 100%, at least 200%, at least 300%, at least 400%, at least 500%, at least 600%, at least 700%, at least 800%, at least 900%, or at least 1000% relative to an otherwise similar film, without the exfoliated filler. For example, by way of comparison, a typical polyethylene or polypropylene film may have a thermal diffusivity on the order of about 1×10' m²/s or less, and a thermal conductivity of about 0.2-0.5 W/(m.K). The composite film was thermally stable (e.g., it did not deteriorate under typical elevated temperature conditions (e.g., up to 50° C., up to 80° C., up to 100° C., up to 150° C., up to 200° C., up to 250° C., up to 300° C., up to 350° C., up to 400° C. as shown in FIG. 10).

Figure 8A:
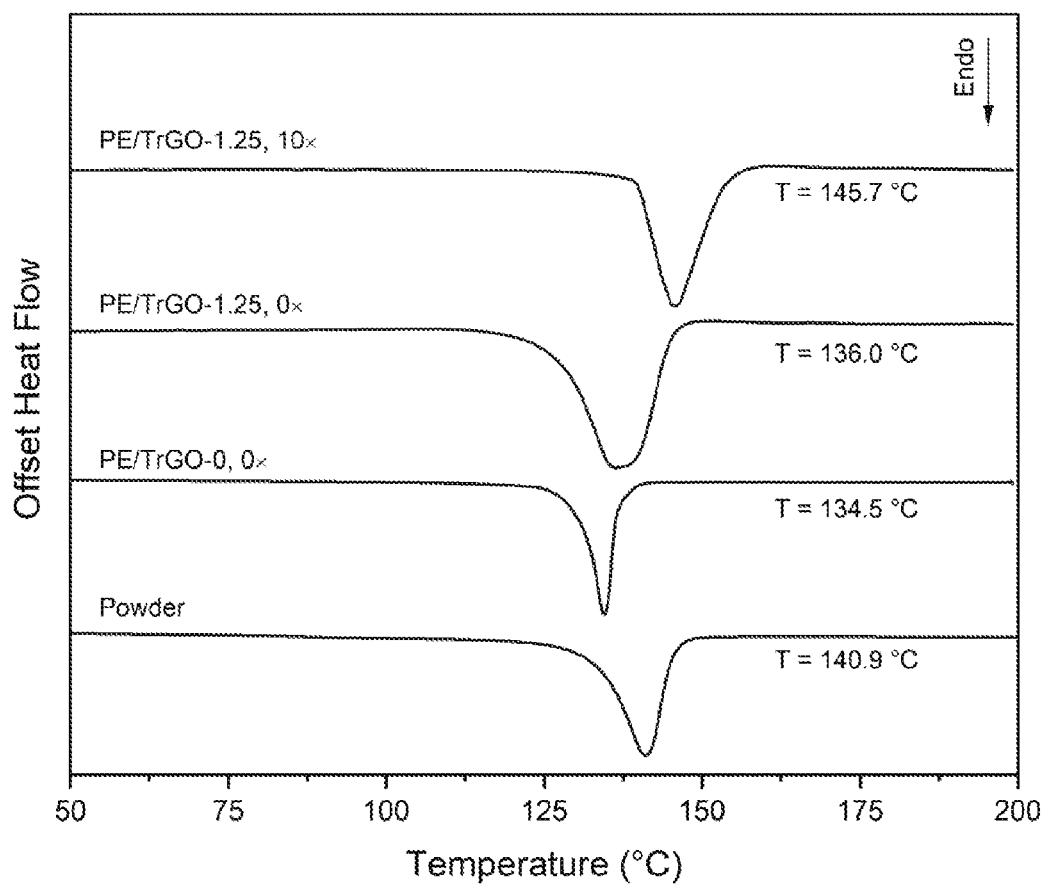
FIG. 8A charts offset heat flow used to determine melting temperature for various tested PE/TrGO films.
Figure 8B:
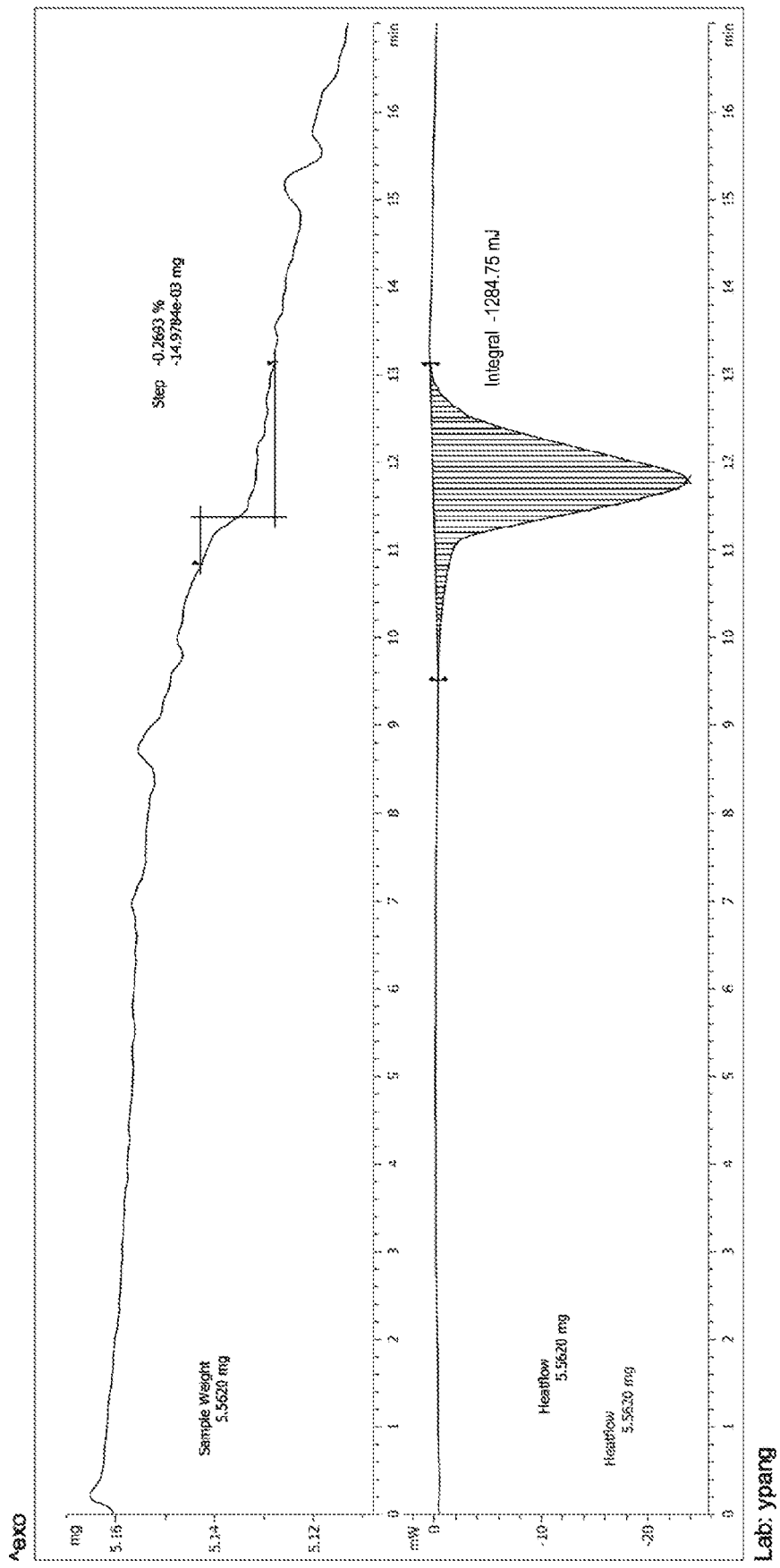
FIG. 8B charts data used in conjunction with determination of the heat capacity of an exemplary PE/TrGO film.

FIG. 8A charts offset heat flow used to determine melting temperature relative to temperature for the starting PE powder, a PE film with 0% TrGO, with 0× draw, a PE film with 1.25% TrGO with 0× draw, and a PE film with 1.25% TrGO with 10× draw. The method used was differential scanning calorimetry (DSC). FIG. 8B charts data used in conjunction with determination of the heat capacity of the film with 1.25% TrGO with 10× draw.

Figure 9A:
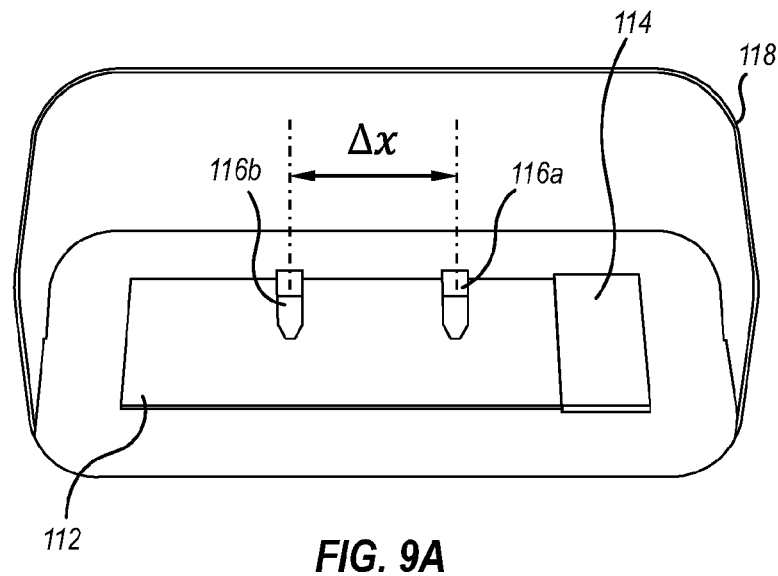
FIG. 9A schematically illustrates how thermal diffusivity and thermal conductivity were measured for exemplary composite films.
Figure 9B:
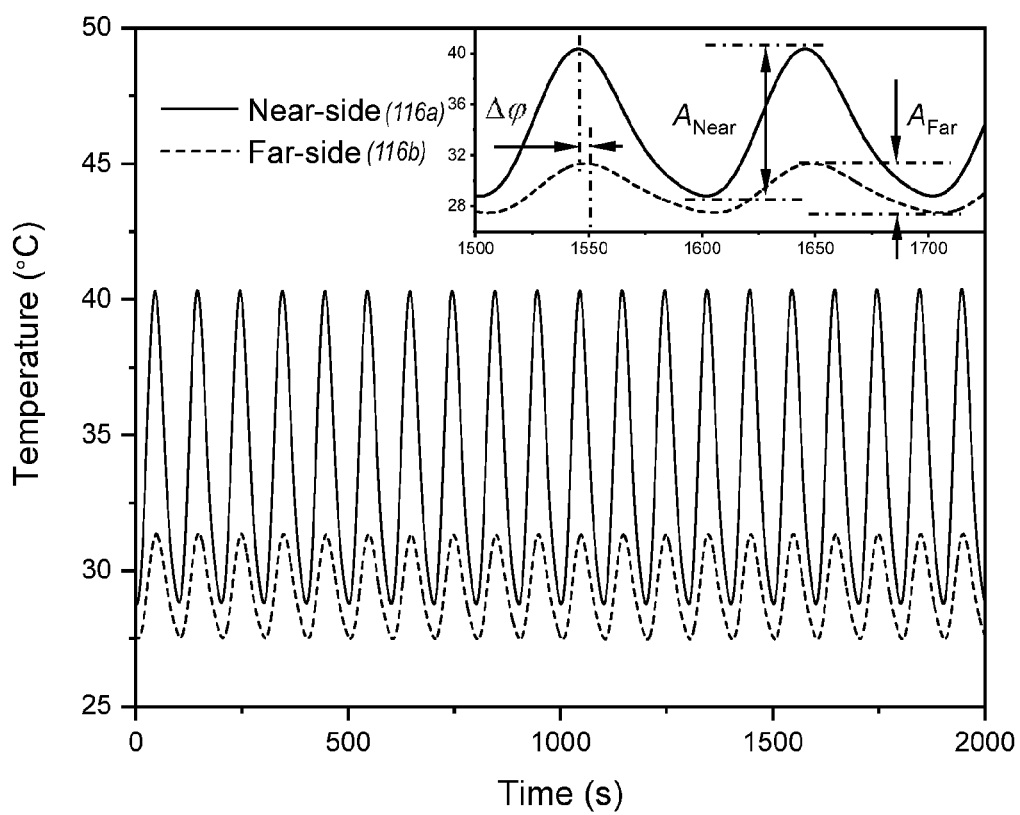
FIG. 9B charts measured temperature at near side and far side thermocouples over time using the apparatus of FIG. 9A.

FIG. 9A schematically illustrates how thermal diffusivity and thermal conductivity were measured, in which 112 is the composite film being evaluated, 114 is the heater configured to generate sin wave heating, 116a and 116b are thermocouples spaced 3 mm apart, and 118 is the vacuum chamber at 5-7 torr pressure, in which the measurements were conducted. FIG. 9B charts measured temperature at thermocouples 116a (near side) and 116b (far side) over time. Thermal diffusivity was calculated as $$\alpha = \frac{\Delta x^2}{2\Delta\varphi \ln \frac{A_{Near}}{A_{Far}}}$$

where $\Delta x$ is the thermocouple separation (i.e., 3 mm), $\Delta\varphi$ is the offset between the nearside and farside peaks, $A_{Near}$ is the amplitude of the wave measured at nearside thermocouple 116a, and $A_{Far}$ is the amplitude of the wave measured at farside thermocouple 116b, all as shown in the inset to FIG. 9B.

FIG. 10 charts weight loss percentage versus temperature, according to a thermal gravimetric analysis (TGA), showing temperature stability up to about 400° C. for the tested film with 1.25% TrGO in a polyethylene matrix, drawn at 10×.

Features from any of the disclosed embodiments or claims may be used in combination with one another, without limitation. It will be appreciated that the scope of the present disclosure extends to rewriting any of the claims to depend from any other claim, to include multiple dependencies from any combination of other claims, and/or to combine multiple claims together. Such also extends to any individual or combinations of features of any of the embodiments as described in the Summary section, as well as the Detailed Description section. The scope of the present disclosure extends to inserting and/or removing any feature or combination of features from any claim or described embodiment, for insertion into another claim or embodiment, or drafting of a new claim including any combination of such features from any other claim(s) or embodiments.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A nano-composite film comprising:
    a polymer matrix;
    an exfoliated filler disposed within the polymer matrix;
    wherein the nano-composite film has a specific tensile strength that is greater than 1 GPa/g/cm$^3$, a specific Young's modulus that is greater than 100 GPa/g/cm$^3$, or both.

2. A nano-composite film as recited in claim 1, wherein the polymer matrix comprises polyethylene.

3. A nano-composite film as recited in claim 1, wherein the filler comprises one or more of graphene or hexagonal boron nitride (h-BN).

4. A nano-composite film as recited in claim 1, wherein filler comprises one or more of a thermally reduced graphene oxide, a chemically reduced graphene oxide, or a functionalized graphene oxide.

5. A nano-composite film as recited in claim 1, wherein the exfoliated filler is present in the nano-composite film in an amount of greater than 0% and up to 1% by weight.

6. A nano-composite film as recited in claim 1, wherein the exfoliated filler is present in the nano-composite film in an amount from 0.1% to 1% by weight.

7. A nano-composite film as recited in claim 1, wherein the nano-composite film has a specific tensile strength that is greater than 1 GPa/g/cm$^3$ and a specific Young's modulus that is greater than 100 GPa/g/cm$^3$.

8. A nano-composite film as recited in claim 1, wherein the nano-composite film has a specific tensile strength that is at least 1.5 GPa/g/cm$^3$.

9. A nano-composite film as recited in claim 1, wherein the nano-composite film has a specific tensile strength that is from 1.5 GPa/g/cm$^3$ to 4 GPa/g/cm$^3$.

10. A nano-composite film as recited in claim 1, wherein the nano-composite film has a specific Young's modulus that is at least 150 GPa/g/cm$^3$.

11. A nano-composite film as recited in claim 1, wherein the nano-composite film has a specific Young's modulus that is from 150 GPa/g/cm$^3$ to 250 GPa/g/cm$^3$.

12. A nano-composite film as recited in claim 1, wherein the polymer matrix comprises ultrahigh molecular weight polyethylene (UHMWPE), the UHMWPE having a molecular weight from 3.5 to 7.5 million amu.

13. A nano-composite film as recited in claim 1, wherein the polymer matrix comprises ultrahigh molecular weight polyethylene (UHMWPE), the UHMWPE having a molecular weight of about 5.5 million amu.

14. A nano-composite film comprising:
    a polymer matrix;
    an exfoliated filler disposed within the polymer matrix;
    wherein the nano-composite film has a specific tensile strength that is greater than 1 GPa/g/cm$^3$.

15. A nano-composite film as recited in claim 14, wherein the polymer matrix comprises polyethylene.

16. A nano-composite film as recited in claim 14, wherein the filler comprises one or more of graphene, a thermally reduced graphene oxide, a chemically reduced graphene oxide, a functionalized graphene oxide or hexagonal boron nitride (h-BN).

17. A nano-composite film as recited in claim 14, wherein the exfoliated filler is present in the nano-composite film in an amount from 0.1% to 1% by weight.

18. A nano-composite film comprising:
    a polymer matrix;
    an exfoliated filler disposed within the polymer matrix;
    wherein the nano-composite film has a specific Young's modulus that is greater than 100 GPa/g/cm$^3$.

19. A nano-composite film as recited in claim 18, wherein the polymer matrix comprises polyethylene.

20. A nano-composite film as recited in claim 18, wherein the filler comprises one or more of graphene, a thermally reduced graphene oxide, a chemically reduced graphene oxide, a functionalized graphene oxide or hexagonal boron nitride (h-BN).

* * * * *